(12) United States Patent
Yamagishi

(10) Patent No.: US 10,440,427 B2
(45) Date of Patent: Oct. 8, 2019

(54) CONTENT SUPPLY DEVICE, CONTENT SUPPLY METHOD, PROGRAM, TERMINAL DEVICE, AND CONTENT SUPPLY SYSTEM

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 210 days.

(21) Appl. No.: 14/899,237

(22) PCT Filed: Jun. 16, 2014

(86) PCT No.: PCT/JP2014/065854
§ 371 (c)(1),
(2) Date: Dec. 17, 2015

(87) PCT Pub. No.: WO2014/208377
PCT Pub. Date: Dec. 31, 2014

(65) Prior Publication Data
US 2016/0150273 A1  May 26, 2016

(30) Foreign Application Priority Data

Jun. 26, 2013 (JP) ................................. 2013-133671

(51) Int. Cl.
*H04N 7/173* (2011.01)
*H04N 21/438* (2011.01)
(Continued)

(52) U.S. Cl.
CPC ..... *H04N 21/4384* (2013.01); *H04N 21/2353* (2013.01); *H04N 21/23439* (2013.01);
(Continued)

(58) Field of Classification Search
CPC .......... H04N 21/6408; H04N 21/6405; H04N 21/4384
(Continued)

(56) References Cited

U.S. PATENT DOCUMENTS 9,338,209 B1 * 5/2016 Begen .................. H04L 65/601
9,596,447 B2 * 3/2017 Chen .................... H04N 19/597
(Continued)

OTHER PUBLICATIONS

Extended European Search Report of EP Patent Application No. 14817480.8, dated Nov. 8, 2016, 12 pages.
(Continued)

*Primary Examiner* — Hunter B Lonsberry
*Assistant Examiner* — Sahar Aqil Riaz
(74) *Attorney, Agent, or Firm* — Oblon, McClelland, Maier & Neustadt, L.L.P.

(57) ABSTRACT

The present disclosure relates to a content supply device, a content supply method, a program, a terminal device, and a content supply system, which are capable of implementing rapid zapping between channels in DASH. The content supply device of the present disclosure generates a zapping segment stream by delimiting zapping streaming data among a plurality of pieces of streaming data into minimum units when reception of the streaming data is switched, according to a common timing with another channel, unicast-delivers the zapping segment stream, multicast-delivers the zapping segment stream, and generates a metafile for a reception side to receive the zapping segment stream that is unicast-delivered and multicast-delivered. The present disclosure can be applied to a system that delivers content in a streaming manner.

18 Claims, 17 Drawing Sheets

(51) Int. Cl.
    *H04N 21/6405* (2011.01)
    *H04N 21/845* (2011.01)
    *H04N 21/235* (2011.01)
    *H04N 21/61* (2011.01)
    *H04N 21/63* (2011.01)
    *H04N 21/6408* (2011.01)
    *H04N 21/2343* (2011.01)
    *H04N 21/262* (2011.01)
    *H04N 21/6437* (2011.01)

(52) U.S. Cl.
    CPC ... *H04N 21/26258* (2013.01); *H04N 21/6125* (2013.01); *H04N 21/631* (2013.01); *H04N 21/6405* (2013.01); *H04N 21/6408* (2013.01); *H04N 21/6437* (2013.01); *H04N 21/8456* (2013.01)

(58) Field of Classification Search
    USPC .......................................... 725/86, 91, 94, 95
    See application file for complete search history.

(56) References Cited

U.S. PATENT DOCUMENTS

| | | | | |
|---|---|---|---|---|
| 2009/0293093 | A1* | 11/2009 | Igarashi | H04N 21/23439 725/115 |
| 2012/0254456 | A1* | 10/2012 | Visharam | H04N 21/2343 709/231 |
| 2012/0259994 | A1* | 10/2012 | Gillies | H04L 12/1881 709/231 |
| 2012/0278495 | A1* | 11/2012 | Furbeck | H04N 21/6131 709/231 |
| 2013/0007223 | A1* | 1/2013 | Luby | H04N 21/23106 709/219 |
| 2013/0091251 | A1* | 4/2013 | Walker | H04N 21/6125 709/219 |
| 2013/0246643 | A1* | 9/2013 | Luby | H04N 21/23439 709/231 |
| 2014/0095668 | A1* | 4/2014 | Oyman | H04W 4/70 709/219 |
| 2014/0201324 | A1* | 7/2014 | Zhang | H04L 65/4084 709/217 |
| 2014/0372624 | A1* | 12/2014 | Wang | H04L 65/60 709/231 |

OTHER PUBLICATIONS

Wallendael, et al., "Fast Channel Switching Based on SVC in IPTV Environments", IEEE Transactions on Broadcasting, vol. 58, No. 1, Mar. 2012, pp. 57-65.
"Thoughts on Dash and MMT after MMT/DASH Adhoc", 14 pages.
"USD Signaling of DASH Transport", 3GPP TSG-SA4 #73, Qingdao, China, Apr. 15-19, 2013, 08 pages.
Alex Giladi, "Low Latency Live Delivery in DASH", ISO/IEC JTC1/SC29AVG11 MPEG2012/M 26652, Geneva, Switzerland, May 2012, 06 pages.

* cited by examiner

```
<MPD ......>
<Period ......>
<AdaptationSet>
<Representation ......>
......
<BaseURL>http://example.com/counter-10mn_avc_dash.mp4</BaseURL>
<SegmentList ......>
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

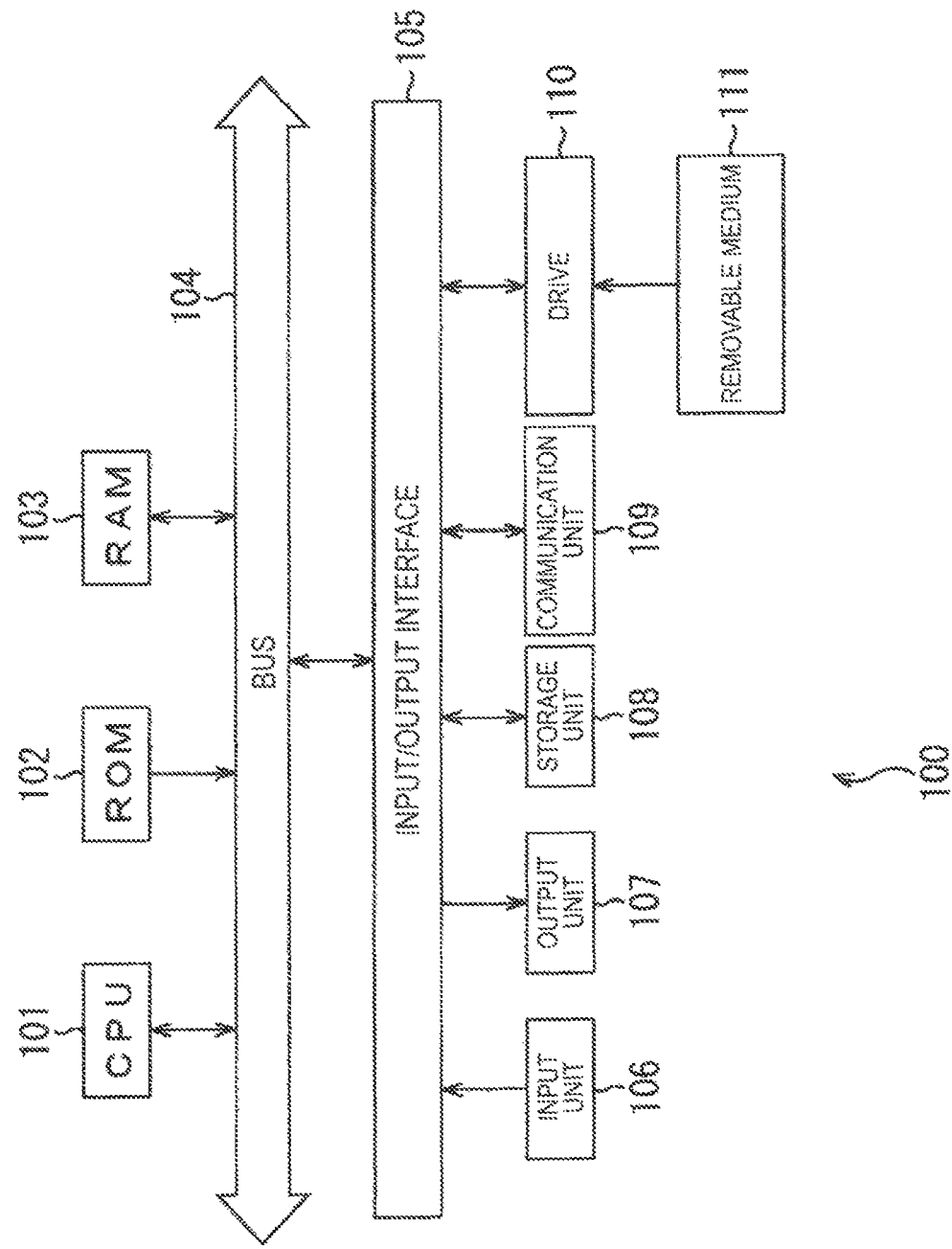

CONTENT SUPPLY DEVICE, CONTENT SUPPLY METHOD, PROGRAM, TERMINAL DEVICE, AND CONTENT SUPPLY SYSTEM

TECHNICAL FIELD

The present disclosure relates to a content supply device, a content supply method, a program, a terminal device, and a content supply system, and more particularly, to a content supply device, a content supply method, a program, a terminal device, and a content supply system capable of performing zapping between channels through which different content is delivered rapidly.

BACKGROUND ART

Moving Picture Experts Group-Dynamic Adaptive Streaming over HTTP (hereinafter, referred to as "DASH") (MPEG-DASH) using the same HTTP as browsing of a web site as an internationally standardized moving image delivery protocol available for moving image delivery via the Internet has been known (for example, see Non-Patent Literature 1).

DASH implements adaptive streaming technology. In other words, a content supply side is configured to prepare a plurality of streams in which content of the same subject is included, and an image quality, an angle of view size, or the like changes according to a communication environment of the internet serving as a delivery path or a capability or a state of a reception side. On the other hand, the reception side can select an optimal stream among the plurality of streams prepared by the supply side according to the communication environment of the Internet, the decoding capability of the reception side, or the like and acquire and reproduce the selected optimal stream.

As described above, in the DASH, a metafile called a media presentation description (MPD) is supplied from the supply side to the reception side so that the reception side can adaptively select and acquire a stream.

An address (url information) of a supply source of streaming data (media data such as audio video/subtitle) of content divided into chunks is described in the MPD. The reception side can access a predetermined server serving as a content supply source based on the url information, requests streaming data, and receives and reproduce streaming data HTTP-unicast-delivered according to the request.

FIG. 1 illustrates an example of a configuration of a content supply system that delivers content in a streaming manner based on the DASH.

A content supply system 10 includes a plurality of content supply devices 20 (in this case, 20A, 20B, and 20C) of a side at which content is supplied and a plurality of DASH clients 30 of a side at which content is received. The DASH clients 30 are connected to the content supply device 20 via a CDN 12 using the internet 11.

The content supply device 20A delivers content of the same subject through a plurality of streams as a channel A. The content supply device 20B delivers content of the same subject different from content of the channel A through a plurality of streams as a channel B. The same applies to the content supply device 20C. Hereinafter, when it is unnecessary to distinguish the content supply devices 20A 20B, and 20C individually, the content supply device is referred to simply as a content supply device 20.

The content supply device 20 includes a content management server 21, a DASH segment streamer 22, and a DASH MPD server 23.

The content management server 21 manages content supplied to the DASH clients 30, generates a plurality of pieces of streaming data having different bit rates from content of the same subject, and outputs the generated streaming data to the DASH segment streamer 22.

The DASH segment streamer 22 temporally divides each piece of streaming data into segments, holds each of the segments as a file, and notifies the DASH MPD server 23 of an address of a supply source of the files. Further, the DASH segment streamer 22 HTTP-unicast-delivers the file of the segmented streaming data in response to a request (an HTTP request) from the DASH client 30, as a WEB server.

The DASH MPD server 23 generates an MPD in which, for example, an address indicating a supply source of files of (segments of) a plurality of pieces of streaming data is described. The DASH MPD server 23 HTTP-unicast-delivers the generated MPD according to the request (the HTTP request) from the DASH client 30 as the WEB server.

The DASH client 30 requests the DASH MPD server 23 to transmit the MPD, request the DASH segment streamer 22 to transmit the streaming data based on the MPD HTTP-unicast-delivered according to the request, and receive and reproduce the file HTTP-unicast-delivered according to the request.

A cache server (not illustrated) is installed on the CDN 12. The cache server caches the MPD or the file of the streaming data which is HTTP-unicast-delivered through the CND 12, and HTTP-unicast-delivers the cached MPD or the like to the DASH client 30 that has transmitted the HTTP request instead of the DASH MPD server 23 serving as the WEB server or the DASH segment streamer 22.

CITATION LIST

Non-Patent Literature

Non-Patent Literature 1: Mitsuhiro Hirabayashi "Achieving Uninterrupted Video Streaming Using Existing Web Servers:" NIKKEI ELECTRONICS, Mar. 19, 2012

SUMMARY OF INVENTION

Technical Problem

As described above, in DASH, an adaptive streaming technique using HTTP-unicast delivery is implemented, and in the configuration of FIG. 1, a plurality of channels (the content supply devices 20A, 20B, and 20C) are prepared, and thus a plurality of pieces of content having different subjects can be simultaneously delivered to the reception side.

When it is possible to simultaneously supply a plurality of pieces of content having different subjects as described above the viewer is expected to be able to perform so-called zapping (an operation of switching channels one after another within a short period of time and searching for content to be viewed), similarly to when viewing television broadcasts.

In DASH, switching between channels is performed in units of segments or in units of sub segments obtained by subdividing a segment. Hereinafter, a description will continue under the assumption that, in DASH, switching between channels is performed in units of segments.

FIGS. 2 and 3 illustrate that three streams (representations) having different bit rates serving as content of the same subject in channels A, B, and C of DASH are prepared, and illustrate switching examples when zapping between channels is performed.

In DASH, since a segment length (a duration) is arbitrary, channels need not necessarily have the same segment length. Further, channels need not necessarily have the same reproduction start time of a segment at the head of content.

FIG. 2 illustrates an example in which channels have neither the same segment length nor the same reproduction start time of the segment at the head of content.

In this case, even if the user of the DASH client 30 gives an instruction to perform switching (zapping) to a representation B2 of a channel B before T1 on a DASH client time axis while viewing a representation A2 of a channel A, the switching is delayed until T2 serving an a segment delimiter of the representation B2. Further, even if the user gives an instruction to perform switching to a representation C2 of a channel C before T3 while viewing the representation B2 of the channel B, the switching is delayed until T4 serving as a segment delimiter of the representation C2.

FIG. 3 illustrates an example in which channels do not have the same segment length, but the reproduction start times of the segments at the head of content are matched in synchronization with an NTP time axis.

In this case, even if the user of the DASH client 30 gives an instruction to perform switching to the representation B2 of the channel B before T1 on the NTP time axis while viewing the representation A2 of the channel A, the switching is delayed until T2 serving as a segment delimiter of the representation B2. Further, even if the user gives an instruction to perform switching to the representation C2 of the channel C before T3 while viewing the representation B2 of the channel B, the switching is delayed until T4 serving as a segment delimiter of the representation C2.

As described above, in DASH, when a stream is switched between channels, an extra delay occurs. Thus, in this case, it is difficult to perform rapid zapping between channels.

Further, although the occurrence of the above-described delay can be suppressed by reducing the segment length of the segment of each channel to be extremely small, in this case, coding efficiency deteriorates, a data amount of a stream increases, and a wide communication band is necessary, and thus an excessive load is put on the Internet 11, and service quality is likely to deteriorate.

The present disclosure was made in light of the foregoing, and it is desirable to implement rapid zapping between channels in DASH.

Solution to Problem

According to a first aspect of the present disclosure, there is provided a content supply device that supplies a plurality of pieces of streaming data that include content of a same subject and differ in attribute through a same channel, according to an adaptive streaming technique, the content supply device including: a zapping segment stream generating unit configured to generate a zapping segment stream by delimiting zapping streaming data among the plurality of pieces of streaming data into minimum units when reception of the streaming data is switched, according to a common timing with another channel; a unicast delivery unit configured to unicast-deliver the zapping segment stream; a multicast delivery unit configured to multicast-deliver the zapping segment stream; and a metafile generating unit configured to generate a metafile for a reception side to receive the zapping segment stream that is unicast-delivered and multicast-delivered.

The zapping segment stream generating unit can generate the zapping segment stream by delimiting the zapping streaming data into the minimum units, according to a common timing with the other channel belonging to a same group.

The unicast delivery unit can HTTP-unicast-deliver the zapping segment stream. The multicast delivery unit can FLUTE-multicast-deliver a zapping FLUTE stream based on the zapping segment stream.

The content supply device according to the first aspect of the present disclosure can further include: an RTP stream generating unit configured to generate a zapping RTF stream based on the zapping streaming data among the plurality of pieces of streaming data. The metafile generating unit can generate a metafile for the reception side to receive the zapping segment stream that is HTTP-unicast-delivered, the zapping FLUTE stream that is FLUTE-multicast-delivered, and the zapping RTP stream that is RTP-multicast-delivered. The multicast delivery unit can also RTP-multicast-deliver the zapping RTP stream.

The zapping segment stream generating unit can generate the zapping segment stream by aligning heads of the minimum units with the other channel belonging to the same group in synchronization with an NTP time axis and delimiting the zapping streaming data into the minimum units using a common duration with the other channel belonging to the same group.

The zapping segment stream generating unit can generate the zapping segment stream by delimiting the zapping streaming data into the minimum units using a duration shorter than the minimum unit of viewing streaming data.

The metafile generating unit can generate an extended MPD as the metafile.

The content supply device according to the first aspect of the present disclosure can further include: a collecting unit configured to collect the metadata and supply the metadata to the reception side.

The metafile generating unit can generate the MPD in which an MPD/@NTPSynchronized attribute and an MPD/SegmentAlignedGroupID attribute are introduced, as the metafile. The collecting unit can collect the metadata for the zapping based on the MPD/@NTPSynchronized attribute and the MPD/SegmentAlignedGroupID attribute.

The metafile generating unit can generate the MPD in which an MPD/@for Zapping attribute is introduced, as the metafile. The collecting unit can collect the metadata for the zapping based on the MPD/@forZapping attribute.

The metafile generating unit can describe at least one of a duration and a maximum duration of the minimum unit of the streaming data in the metadata, as the metafile. The collecting unit can collect the metadata for the zapping based on the at least one of the duration and the maximum duration of the minimum unit of the a streaming data.

According to the first aspect of the present disclosure, there is provided a content supply method of a content supply device that supplies a plurality of pieces of streaming data that include content of a same subject and differ in attribute through a same channel, according to an adaptive streaming technique, the content supply method including; a zapping segment stream generating step of generating, by the content supply device, a zapping segment stream by delimiting zapping streaming data among the plurality of pieces of streaming data into minimum units when reception of the streaming data is switched, according to a common liming with another channel; a unicast delivery step of unicast-delivering, by the content supply device, the zapping segment stream; a multicast delivery step of multicastdelivering, by the content supply device, the zapping segment stream; and a metafile generating step of generating, by the content supply device, a metafile for a reception side to receive the zapping segment stream that is unicast-delivered and multicast-delivered.

According to the first aspect of the present disclosure, there is provided a program causing a computer that supplies a plurality of pieces of streaming data the include content of a same subject and differ in attribute through a same channel, according to an adaptive streaming technique to function as: a zapping segment stream generating unit configured to generate a zapping segment stream by delimiting zapping streaming data among the plurality of pieces of streaming data into minimum units when reception of the streaming data is switched, according to a common timing with another channel; a unicast delivery unit configured to unicast-deliver the zapping segment stream; a multicast delivery unit configured to multicast-deliver the zapping segment stream; and a metafile generating unit configured to generate a metafile for a reception side to receive the zapping segment stream that is unicast-delivered and multicast-delivered.

In the first aspect of the present disclosure, a zapping segment stream is generated by delimiting zapping streaming data among a plurality of pieces of streaming data into minimum units when reception of the streaming data is switched, according to a common timing with another channel, the zapping segment stream is unicast-delivered, and the zapping segment stream is multicast-delivered. Further, a metafile for a reception side to receive the zapping segment stream that is unicast-delivered and multicast-delivered is generated.

According to a second aspect of the present disclosure, there is provided a terminal device that receives streaming data supplied from a content supply device that supplies a plurality of pieces of streaming data that include content of a same subject and differ in attribute through a same channel, according to an adaptive streaming technique. The content supply device includes a zapping segment stream generating unit configured to generate a zapping segment stream by delimiting zapping streaming data among the plurality of pieces of streaming data info minimum units when reception of the streaming data is switched, according to a common timing with another channel, a unicast delivery unit configured to unicast-deliver the zapping segment stream, a multicast delivery unit configured to multicast-deliver the zapping segment stream, and a metafile generating unit configured to generate a metafile for a reception side to receive the zapping segment stream that is unicast-delivered and multicast-delivered. The terminal device acquires the metafile, and switches reception of the zapping segment stream that is unicast-delivered and multicast-delivered through different channels, based on the acquired metafile.

In the second aspect of the present disclosure, the metafile is acquired, and reception of the zapping segment stream that is unicast-delivered and multicast-delivered through different channels is switched based on the acquired metafile.

According to a third aspect of the present disclosure, there is provided a content supply system including: a content supply device configured to supply a plurality of pieces of streaming data that include content of a same subject and differ in attribute through a same channel according to an adaptive streaming technique; and a terminal device configured to receive the streaming data. The content supply device includes a zapping segment stream generating unit configured to generate a zapping segment stream by delimiting zapping streaming data among the plurality of pieces of streaming data into minimum units when reception of the streaming data is switched, according to a common timing with another channel, a unicast delivery unit configured to unicast-deliver the zapping segment stream, a multicast delivery unit configured to multicast-deliver the zapping segment stream, and a metafile generating unit configured to generate a metafile for a reception side to receive the zapping segment stream that is unicast-delivered and multicast-delivered. The terminal device acquires the metafile, and switches reception of the zapping segment stream that is unicast-delivered and multicast-delivered through different channels, based on the acquired metafile.

In the third aspect of the present disclosure, a content supply device generates a zapping segment stream by delimiting zapping streaming data among a plurality of pieces of streaming data into minimum units when reception of the streaming data is switched, according to a common timing with another channel unicast-delivers the zapping segment stream, and multicast-delivers the zapping segment stream. The content supply device generates a metafile for a reception side to receive the zapping segment stream that is unicast-delivered and multicast-delivered. A terminal device acquires the metafile, and switches reception of the zapping segment stream that is unicast-delivered and multicast-delivered through different channels, based on the acquired metafile.

Advantageous Effects of Invention

According to the first to third aspects of the present disclosure, it is possible to implement rapid zapping between channels in DASH.

BRIEF DESCRIPTION OF DRAWINGS

FIG. 8 is a diagram illustrating an arrangement of a USD in an MBMS.

FIG. 10 is a diagram illustrating an example in which an MPD is described in an XML format.

FIG. 17 is a block diagram illustrating an exemplary configuration of a computer.

DESCRIPTION OF EMBODIMENTS

Hereinafter, preferred modes (hereinafter referred to as embodiments) for carrying out the present disclosure will be described in detail. Before that, an overview of the present disclosure will be described with reference to FIG. 4.

Figure 1:
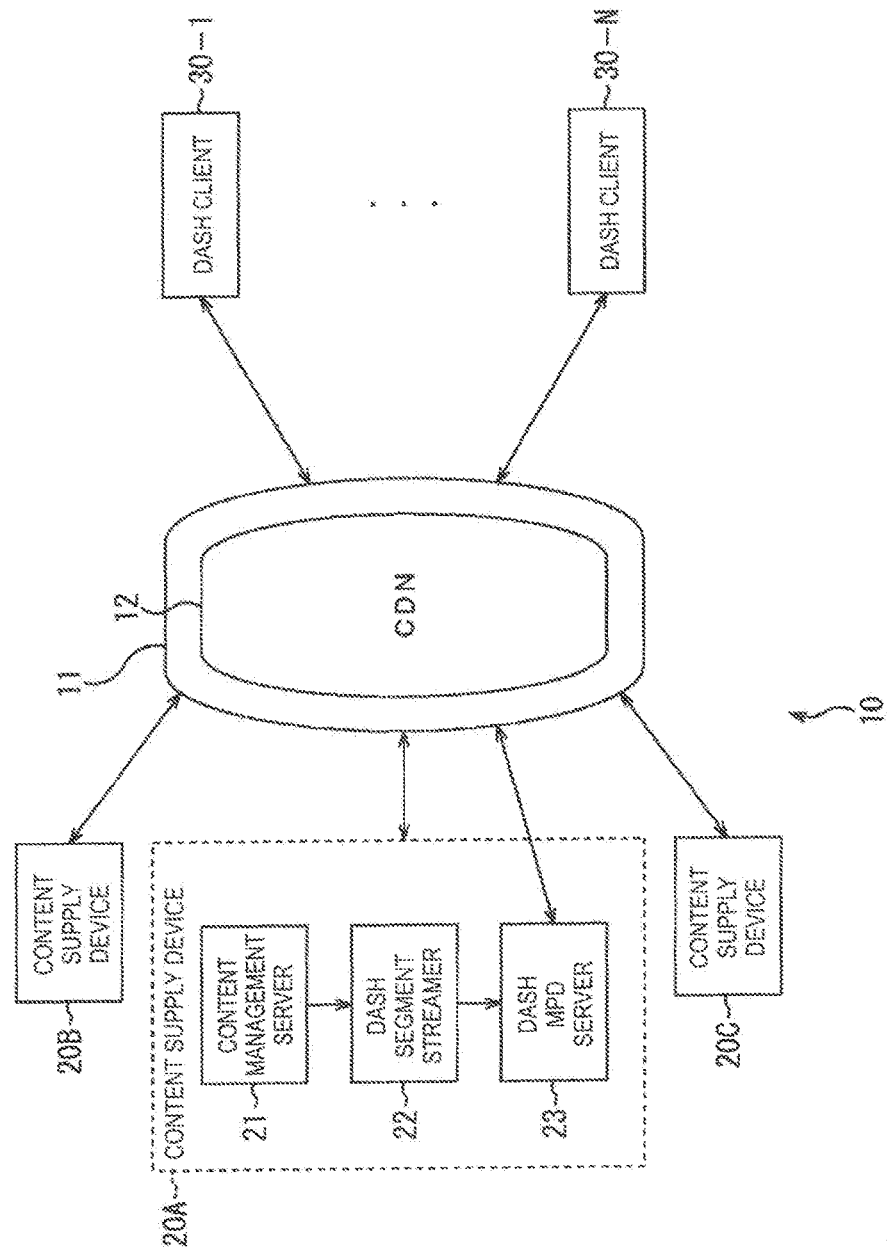
FIG. 1 is a block diagram illustrating an example of a configuration of a content supply system of the related art.
Figure 2:
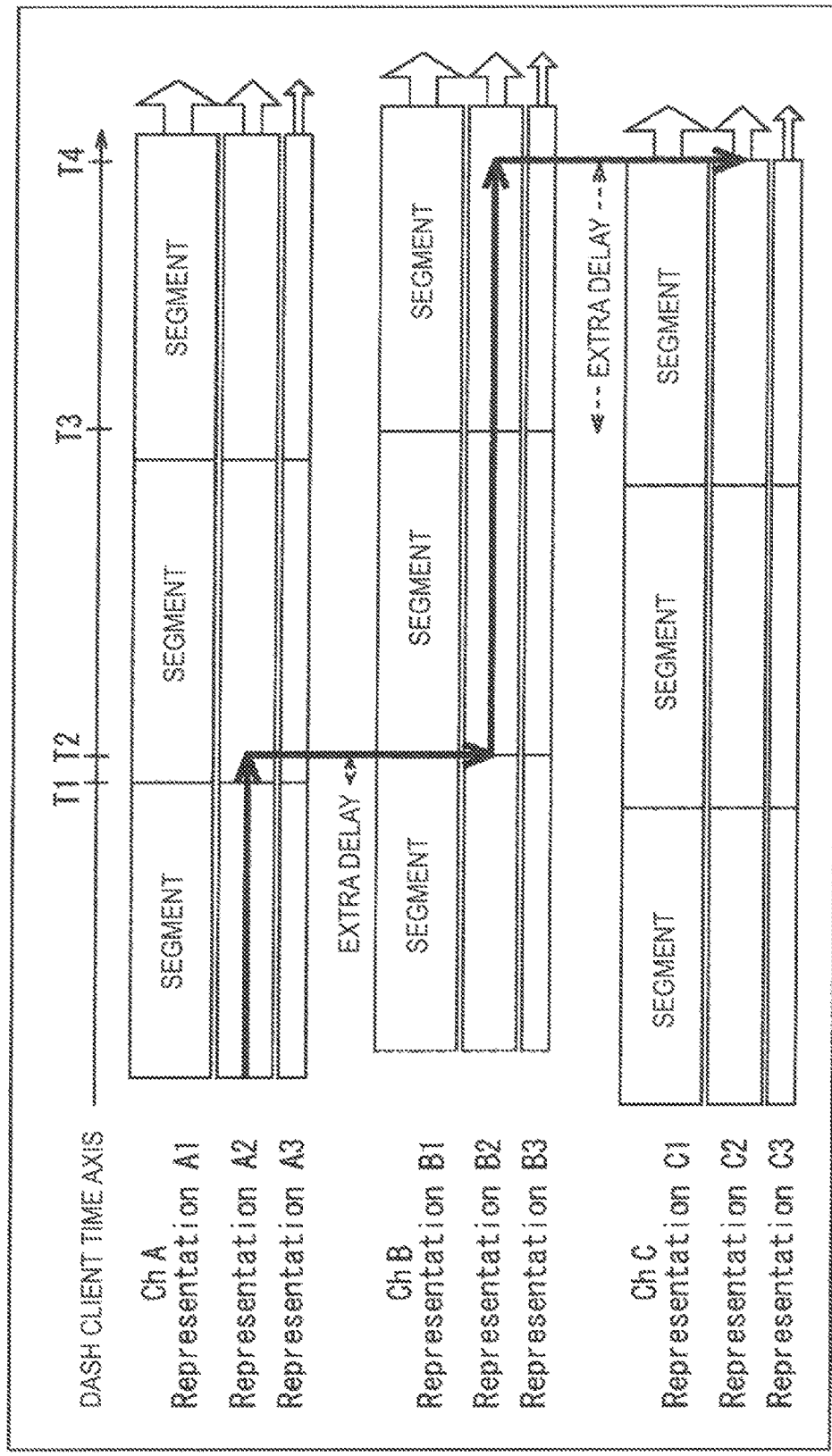
FIG. 2 is a diagram for describing a delay occurring due to switching between channels.
Figure 3:
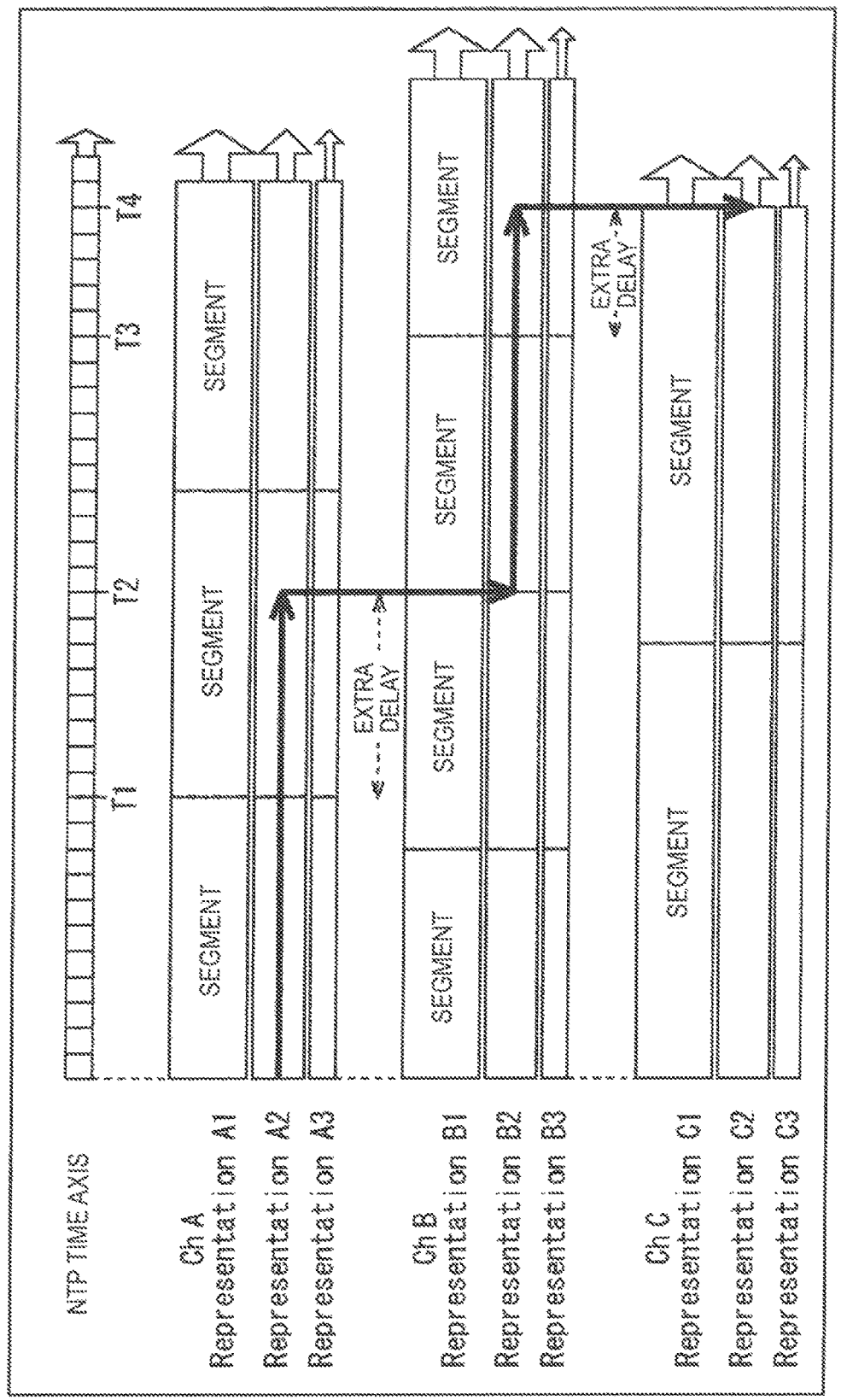
FIG. 3 is a diagram for describing a delay occurring due to switching between channels.
Figure 4:
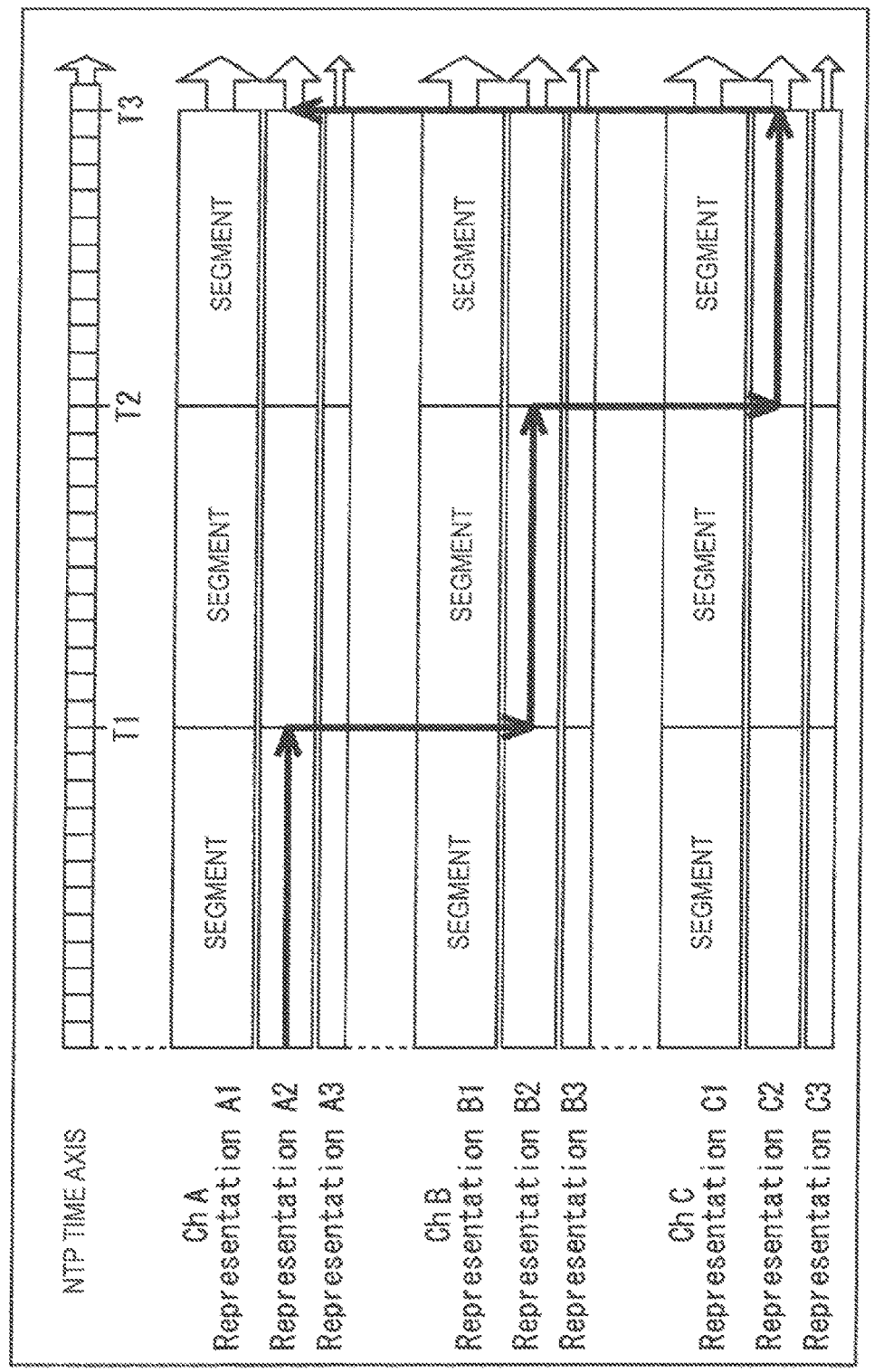
FIG. 4 is a diagram for describing an overview of the present disclosure.

FIG. 4 illustrates a switching example in which zapping is performed among a plurality of channels prepared in a content supply system according to an embodiment of the present disclosure.

FIG. 4 illustrates that different content is delivered in the channels A, B, and C, and three streams (representations) having different bit rates are prepared in each channel.

In the content supply system to which the present disclosure is applied, a segment delimiter of content is synchronized with an NTP time axis, and segment lengths of respective channels belonging to a predetermined group are set to one common duration. Further, starting points (MPD/ @availabilityStartTime+Period/@(start)) of media reproduction times at the heads of segments are set to be matched on the NTP time axis.

As the above setting is performed, when the viewer using the content supply system gives an instruction to perform switching to the representation B2 of the channel B before T1 on the DASH client time axis while viewing the representation A2 of the channel A, the switching is performed at T1 serving as both the segment delimiter of the representation A3 and the segment delimiter of the representation B2 as illustrated in FIG. 4.

Further, when the viewer gives an instruction to perform switching to the representation C2 of the channel C before T2 while viewing the representation B2 of the channel B, the switching is performed at T2 serving as both the segment delimiter of the representation B2 and the segment delimiter of the representation C2. Moreover, when the viewer gives an instruction to perform switching to the representation A2 of the channel A before T3 while viewing the representation C2 of the channel C, the switching is performed at T3 serving as both the segment delimiter of the representation C2 and the segment delimiter of the representation A2.

In the content supply system, one or more pieces of zapping streaming data serving as content of the same subject and two or more pieces of viewing streaming data having a higher bit rate than the zapping streaming data are prepared in each channel. Further, in channels belonging to the same group, the segment lengths of the zapping streaming data are set to the same length, and the reproduction start times of the segments at the heads of content are set to be matched in synchronization with an NTP time.

Further, in the content supply system, the zapping streaming data, the viewing streaming data, and the MPD used to receive the zapping streaming data and the viewing streaming data are supplied through not only HTTP-unicast delivery but also multicast delivery performed via a broadcasting network in which communication quality is guaranteed. Specifically, the MPD is supplied through HTTP-unicast delivery, UPD-multicast delivery, and FLUTE-multicast delivery. The zapping streaming data and the viewing streaming data are supplied through the HTTP-unicast delivery, the FLUTE-multicast delivery, and the RTP-multicast delivery.

Further, when zapping is performed, the reception side receives and reproduces the multicast-delivered zapping streaming data using the MPD that is multicast-delivered whenever possible. When this is difficult, the reception side receives and reproduces the multicast-delivered zapping streaming data using the HTTP-unicast-delivered MPD. When this is also difficult, the reception side receives and reproduces the HTTP-unicast-delivered zapping streaming data using the HTTP-unicast-delivered MPD.

As a result, it is possible to suppress the occurrence of an extra delay when zapping is performed between channels belonging to the same group. Further, it is possible to suppress a situation in which an excessive load is put on the Internet and service quality also deteriorates.

[Exemplary Configuration of Content Supply System]

Figure 5:
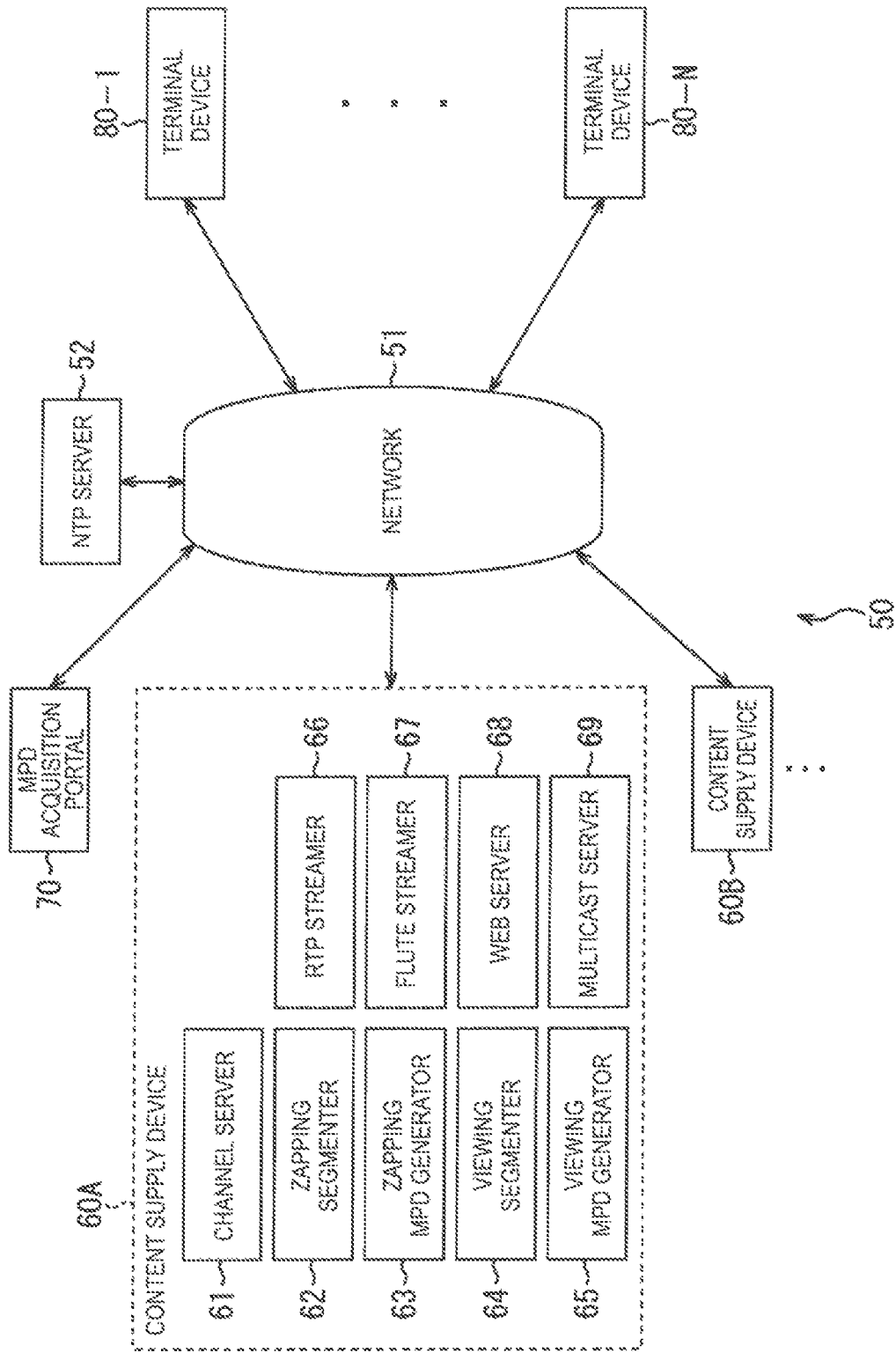
FIG. 5 is a block diagram illustrating an exemplary configuration of a content supply system to which the present disclosure is applied.

FIG. 5 illustrates an exemplary configuration of a content supply system according to an embodiment of the present disclosure.

The content supply system 50 includes a plurality of content supply devices 60X corresponding to a channel X (X=A, B, . . . ), an MPD acquisition portal 70, and a plurality of terminal devices 80. The terminal device 80 is connected to the content supply device 60 via a network 51.

Here, the network 51 includes various broadcasting networks using terrestrial broadcasting waves, satellite broadcasting waves, a mobile broadcasting (e)MBMS, or the like in addition to a two-way communication network represented by the Internet and a CDN using the Internet.

An NTP server 52 that provides system time information according to a UTC time format is disposed on (the Internet included in) the network 51. The content supply devices 60 and the terminal devices 80 are assumed to operate in a state in which system time is synchronized with the NTP time axis according to the system time information provided from the NTP server 52.

The content supply device 60A corresponding to the channel A includes a channel server 61, a zapping segmenter 62, a zapping MPD generator 63, a viewing segmenter 64, a viewing MPD generator 65, an RTF streamer 66, a FLUTE streamer 67, a WEB server 68, and a multicast server 69.

The channel server 61 to the multicast saver 69 installed in the content supply device 60A may be integratedly arranged or may be distributedly arranged via the Internet or the like.

Figure 6:
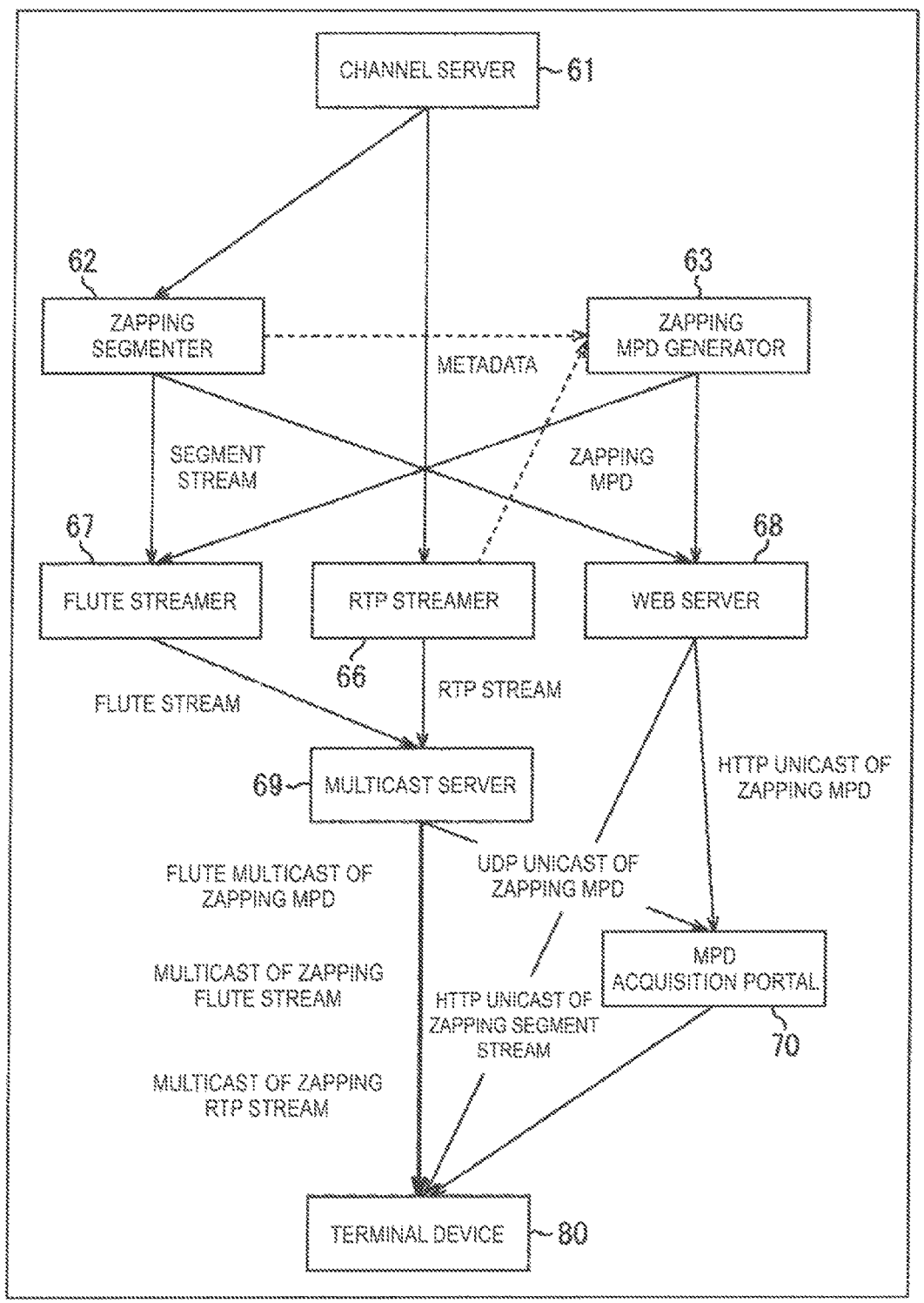
FIG. 6 is a diagram illustrating the flow of data at the time of zapping.
Figure 7:
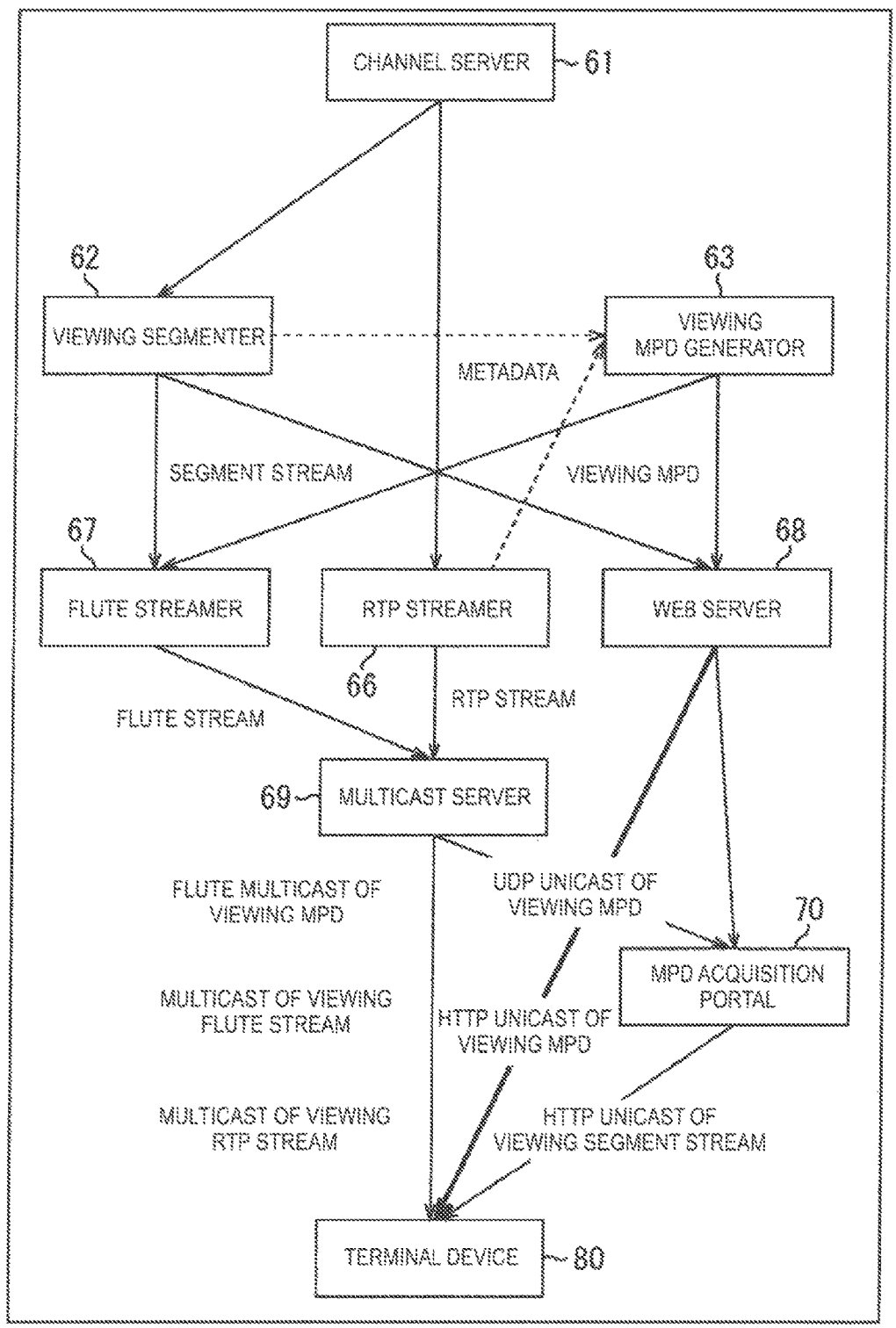
FIG. 7 is a diagram illustrating the flow of data at the time of viewing.

FIGS. 6 and 7 illustrate the flow of various kinds of data between the channel server 61 to the multicast server 69. FIG. 6 illustrates the flow of various kinds of data at the time of zapping, and FIG. 7 illustrates the How of various kinds of data at the time of viewing.

The channel server 61 manages source data of content delivered from the channel A, and generates one or more pieces of zapping streaming data and two or more pieces of viewing streaming data that differ in bit rate from the source data at the same subject. The channel server 61 outputs the zapping streaming data to the zapping segmenter 62 and the RTP streamer 66, and outputs the viewing streaming data to the viewing segmenter 64 and the RTP streamer 66.

The zapping segmenter 62 generates a zapping segment stream such as a fragmented MP4 by temporally delimiting the zapping streaming data into periods and further dividing a period into segments, and outputs the generated zapping segment stream to the FLUTE streamer 67 and the WEB server 68. The zapping segment stream has the same segment length as the zapping segment streams of other channels belonging to the same group, and is set to one duration shorter than a segment length of a viewing segment stream which will be described later. The zapping segmenter 62 operates in synchronization with the NTP time axis, and thus the segment delimiter is synchronized with the NTP time axis as well.

The zapping segmenter 62 notifies the zapping MPD generator 63 of metadata (for example, a URL of the WEB server 68 serving as a supply source of a file storing the zapping segment stream) of the generated zapping segment stream.

The zapping MPD generator 63 generates an MPD (hereinafter referred to as a zapping MPD) extended for zapping necessary when the terminal device 80 receives the zapping segment stream or a zapping RTP stream (which will be described later), and outputs the zapping MPD to the FLUTE streamer 67 and the WEB server 68.

The viewing segmenter 64 generates a viewing segment stream by temporally delimiting the viewing streaming data into periods and further dividing the periods into segments, and outputs the generated viewing segment stream to the FLUTE streamer 67 and the WEB server 68. The viewing segmenter 64 notifies the viewing MPD generator 65 of metadata (for example, a URL of the WEB server 68 serving as a supply source of a file storing the viewing segment stream) of the generated viewing segment stream.

The viewing MPD generator 65 generates an MPD (hereinafter referred to as a viewing MPD) necessary when the terminal device 80 receives the viewing segment stream or a viewing RTP stream (which will be described later), and outputs the generated viewing MPD to the FLUTE streamer 67 and the WEB server 68.

The zapping MPD generated in the zapping MPD generator 63 and the viewing MPD generated in the viewing MPD generator 65 correspond to content of the same subject, and are explicitly associated with each other, for example, through a URL of an acquisition destination. Specifically, for example, when the URL of the acquisition destination of the zapping MPD is http://a.com/channel_1.forZapping.mpd, the URL of the acquisition destination of the viewing MPD is regarded to be http://a.com/channel_1.mpd or the like.

The RTP streamer 66 generates a zapping RTP stream and a viewing RTP stream by storing the zapping streaming data and the viewing streaming data input from the channel server 61 in RTP packets, and outputs the zapping RTP stream and the viewing RTP stream to the multicast server 69. The RTP streamer 66 notifies the zapping MPD generator 63 of the metadata of the zapping RTP stream, and notifies the viewing MPD generator 65 of the metadata of the viewing RTP stream.

The FLUTE streamer 67 generates a zapping FLUTE stream and a viewing FLUTE stream by storing the zapping segment stream input from the zapping segmenter 62 and the viewing segment stream input from the viewing segmenter 64 in FLUTE packets, and outputs the zapping FLUTE stream and the viewing FLUTE stream to the multicast server 69. The FLUTE streamer 67 outputs the zapping MPD input from the zapping MPD generator 63 and the viewing MPD input from the viewing MPD generator 65 to the multicast server 69.

The WEB server 68 HTTP-unicast-delivers the zapping MPD or the viewing MPD to the request source according to a request (an HTTP request) from the MPD acquisition portal 70 or the terminal device 80. The WEB server 68 HTTP-unicast-delivers the zapping segment stream or the viewing segment stream to the request source according to the request (the HTTP request) from the terminal device 80.

The multicast saver 69 FLUTE-multicast-delivers and UDP-multicast-delivers the zapping MPD and the viewing MPD. The multicast server 69 FLUTE-multicast-delivers the zapping FLUTE stream and the viewing FLUTE stream. The multicast server 69 RTP-multicast-delivers the zapping RTP stream and the viewing RTP stream.

The content supply device 60B corresponding to the channel B has a similar configuration to the content supply device 60A, and thus a description thereof is omitted.

The MPD acquisition portal 70 crawls the content supply devices 60 of the respective channels according to the query API requesting the zapping MPD from the terminal device 80, collects the zapping MPDs, and transmits the zapping MPDs to the terminal device 80. When no zapping MPD is generated by the content supply devices 60 of the respective channels, the viewing MPD satisfying a predetermined condition (which will be described later) is collected and transmitted to the terminal device 80. The MPD acquisition portal 70 crawls the content supply devices 60 of the respective channels according to the query API requesting the viewing MPD from the terminal device 80, collects the viewing MPDs, and transmits the viewing MPDs to the terminal device 80.

When the zapping is performed, the terminal device 80 acquires the multicast-delivered zapping MPD whenever possible, and receives and reproduces the multicast-delivered zapping stream (the FLUTE stream or the RTP stream) based on the acquired zapping MPD whenever possible. When this is difficult, the terminal device 80 acquires the HTTP-unicast-delivered MPD, and receives and reproduces the multicast-delivered zapping stream. When this is also difficult, the terminal device 80 receives and reproduces the HTTP-unicast-delivered zapping streaming data using the HTTP-unicast-delivered MPD.

Further, when the terminal device 80 knows the address of the acquisition destination of the zapping MPD or the viewing MPD, the terminal device 80 can acquire the zapping MPD or the viewing MPD directly without using the MPD acquisition portal 70.

The terminal device 80 refers to the zapping MPD or the viewing MPD when receiving the zapping or viewing segment stream or the RTP stream. Further, the terminal device 80 refers to announcement information in which a portal channel of the multicast server 69 performing the FLUTE-multicast delivery is described when receiving the zapping MPD, the viewing MPD, or the zapping or viewing FLUTE stream which is FLUTE-multicast-delivered.

Figure 8:
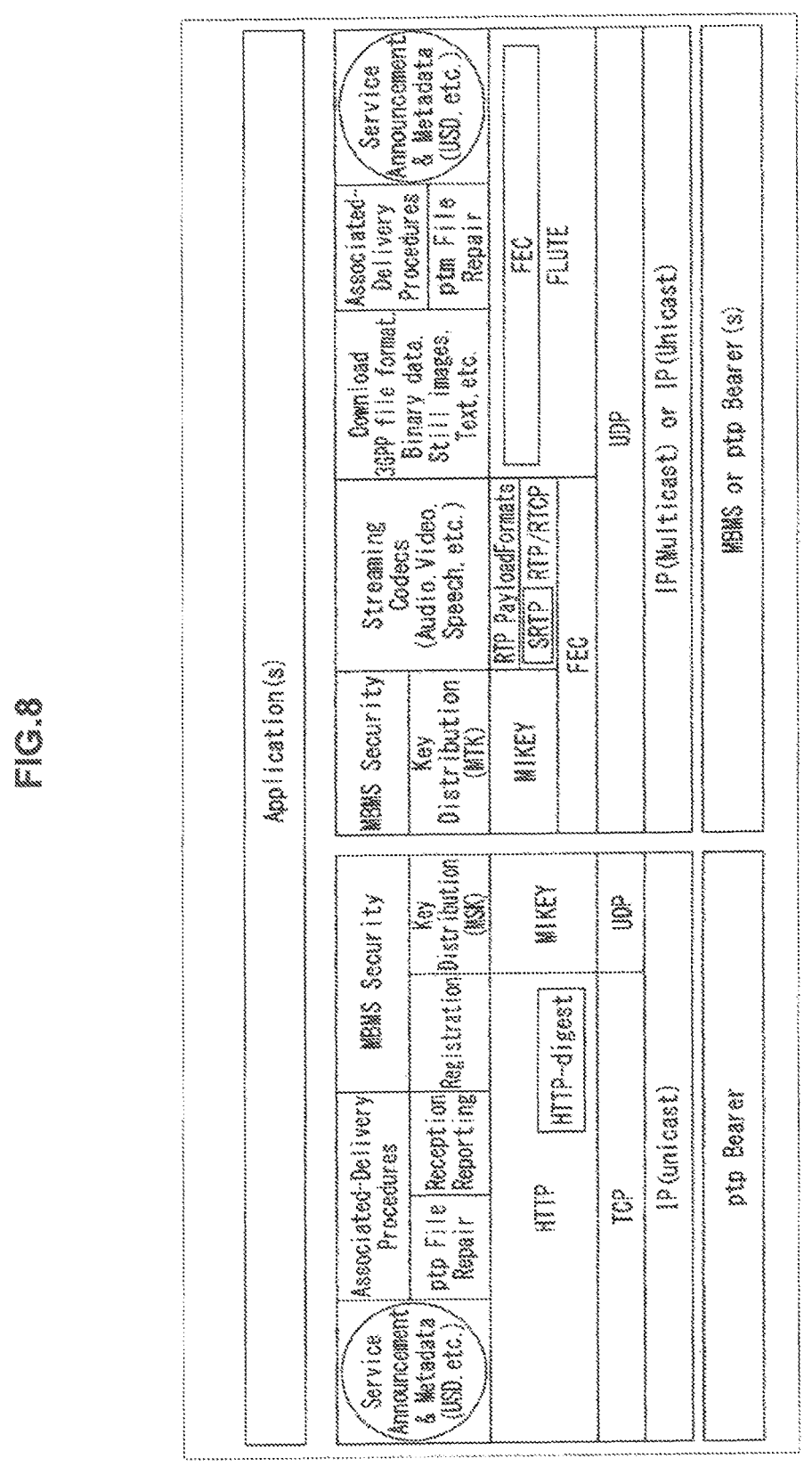

The announcement information is known through an interaction channel or a broadcast/multicast channel, for example, by a user service description (USD) in the MBMS when the FLUTE-multicast delivery is performed through the mobile broadcasting (e)MBMS included in the network 51. FIG. 8 illustrates an arrangement of the USD in the MBMS.

Figure 9:
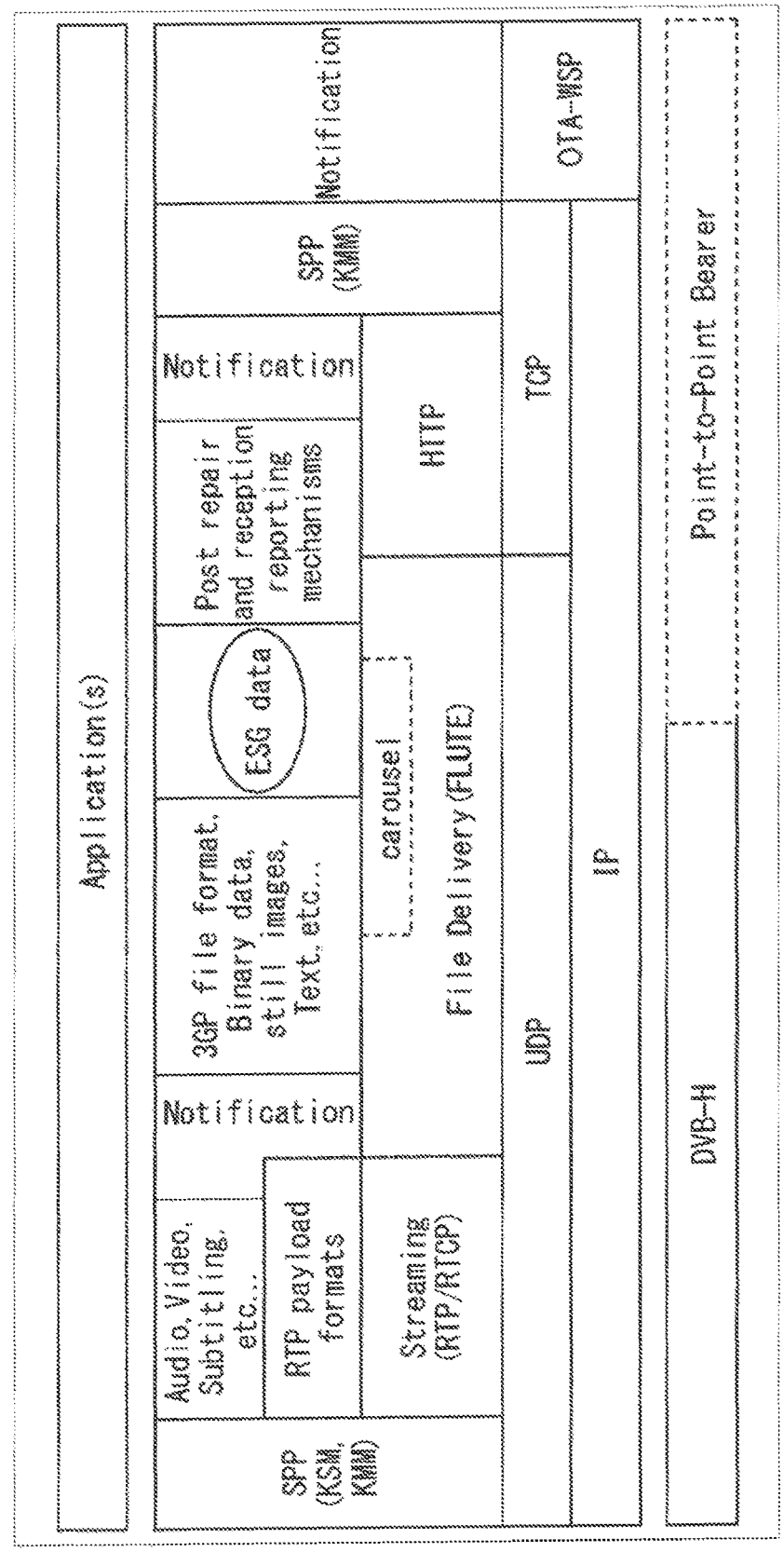
FIG. 9 is a diagram illustrating an arrangement of a USD in an MBMS

Further, when the FLUTE-multicast delivery is performed through the terrestrial broadcasting waves or the satellite broadcasting included in the network 51, the announcement information is known through the interaction channel or the broadcast/multicast channel, for example, an electronic service guide (ESG) of DVB-H (IPDC). FIG. 9 illustrates an arrangement of the ESG in the DVB-H (IPDC).

Alternatively, the MPD acquisition portal 70 may be configured to manage the announcement information and notify the request source of the announcement information according to a request from the terminal device 80.

[Extension of MPD]

Next, the MPD in the DASH and an extension thereof will be described.

In the MPD, information related to content (Media) is divided into units of periods. In each period, a plurality of representations including information related to streaming data of the same subject that differs in image quality or an angle of view size and differs in a stream attribute such as a bit rate are prepared. The representation stores information related to a segment obtained by further temporally dividing a period.

FIG. 10 illustrates an example in which a structure below the representation is described in an XML format.

In FIG. 10, "http://example.com/counter-10mn_ave_dash.mp4" described in MPD/Period/AdaptationSet/Representation/BaseURL indicates the address of the supply source of the file into which a plurality of segments are collectively converted.

MPD/Period/AdaptationSet/Representation/SegmentList/SegmentURL/@mediaRange indicates a byte range of the segmented streaming data in the file.

For example, MPD/Period/AdaptationSet/Representation/SegmentList/SegmentURL/@mediaRange="79583596" indicates that the byte range of a 795th byte to an 83596th byte in the file is first segmented streaming data.

Thus, when the terminal device 40 acquires first segmented streaming data, it is desirable to designate the mediaRange "795-83596" to a range header together with a url "http://example.com/counter-19mn_ave_dash.mp4" of the file and issue an HTTP request. At this time, the HTTP request is as follows:

GET/counter-10mn_ave_dash.mp4HTTP/1.1
Host: example.com
Range: bytes=795-83596

Figure 11:
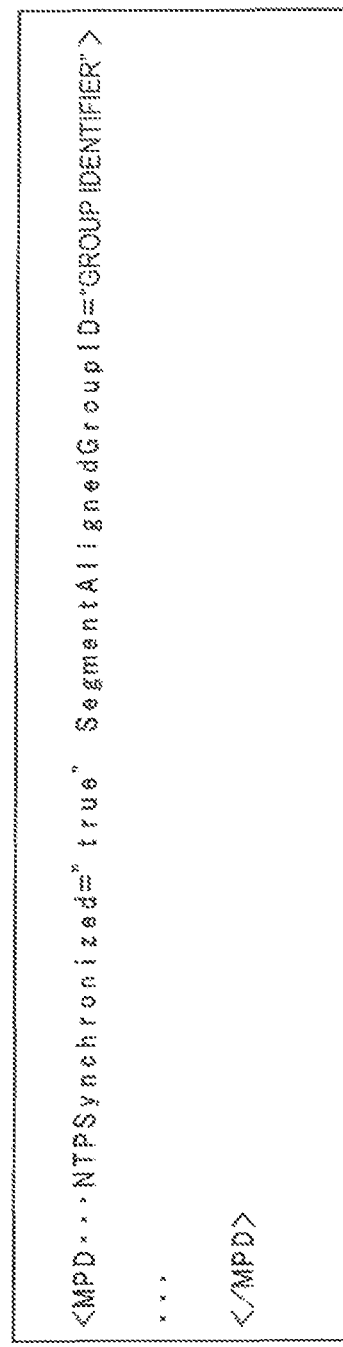
FIG. 11 is a diagram illustrating an example in which an extended MPD is described in an XML format.

FIG. 11 illustrates an example in which a structure below the MPD extended as the zapping MPD is described in an XML format.

In other words, in the extended MPD, an MPD/@NTPSynchronized (a boolean type, and a value is true/false) attribute and an MPD/@SegmentAlignedGroupID (group identifier) attribute are newly introduced below the MPD.

True or false indicating whether or not the segment delimiter of the segment stream for the MPD is in synchronization with the NTP tune axis is described in the MPD@NTPSynchronized attribute. In this case, when the zapping segmenter 62 operates in synchronization with the NTP time axis, the segment delimiters are matched on the NTP time axis. Thus, the value of the synchronous MPD/@NTPSynchronized attribute is true.

An identifier of a group to which channels in which the segment delimiters of the segment stream are matched belong is described in the MPD/@SegmentAlignedGroupID attribute.

Thus, the MPD acquisition portal 70 preferably collects the MPD (the zapping MPD) in which the MPD/@NTPSynchronized attribute is true, and the MPD/@SegmentAlignedGroupID attribute is the same group identifier according to the following query API requesting the zapping MPD from the terminal device 80:

Http://the MPDPortal.com/getMPDforZapping

Between the channels corresponding to Use collected zapping MPD, the segment delimiters are matched in synchronization with the NTP time axis, and thus rapid zapping is possible.

Although not illustrated, in the zapping MPD, within the group to which the channels of the content supply devices 60 belong, the starting points (MPD/@availabilityStartTime+Period/@start) of the media reproduction times at the heads of the segments are matched on the NTP time axis.

At least one of a segmentBase/@duration attribute storing a value indicating the segment length and an MPD@maxSegmentDuration attribute storing a value indicating the maximum segment length is mandatorily described in the zapping MPD and the viewing MPD.

When one of them is described, the non-extended viewing MPD, that is, the viewing MPD in which the MPD/@NTPSynchronized attribute and the MPD/@SegmentAlignedGroupID attribute are not introduced, can be collected as a zapping MPD. Specifically, for example, when the terminal device 80 requests the MPD acquisition portal 70 to transmit the MPD through the following query API, a viewing MPD of a segment length (an expected segment length) satisfying a predetermined condition can be collected. In the following example, the segment length of 2 seconds or less is used as the expected segment length.

Http://MPDPortal.com/
getMPD?expectedSegmentSizeLimit="PT2S"

Between channels corresponding to the collected viewing MPD corresponding to the expected segment length, since the segment length is a relatively short period of time (2 seconds in the above example), the rapid zapping is possible.

Instead of introducing the MPD/@NTPSynchronized attribute and the MPD@SegmentAlignedGroupID attribute, the MPD/forZapping (a boolean type, and a value is true/false) attribute indicating whether or not the MPD is the zapping MPD may be introduced.

A Service Location element is newly introduced in the MPD so that seamless switching between the HTTP-unicast-delivered segment stream and the RTP-multicast-delivered RTP stream can be performed. Further, an rtspRange attribute indicating an interval of a stream segment that is multicast-transmitted and broadcast-transmitted according to an RTP and corresponds to a byte range of a segment that is HTTP-unicast-transmitted is introduced.

The rtspRange attribute specifies an interval of an RTP stream that is RTP-multicast-delivered and serves as a switching target of a segment stream that is HTTP-unicast-delivered and arranged in a SegmentURL element. The rtspRange attribute stores a character string of a format (a UTC format) of a range parameter identifying an RTP stream interval defined in a real time streaming protocol (RTSP) used for control of RTP streaming specified in a request for comment (RFC) 2326. The format of information stored in the rtspRange attribute is not limited to the UTC format.

A ServiceLocationAttributeUrl attribute in which a url of a ServiceLocationAttribute file storing the ServiceLocation element as a root element is arranged in a BaseURL of the MPD.

The ServiceLocation element includes a tuning parameter (DeliverySystemAttributes) and an IP multicast address (IPMulticastAddress).

For example, when a multicast bearer or a broadcast bearer of a mobile network such as the MBMS is used, a format identifier (ID_MBMS in the case of the MBMS) of a data structure of a tuning parameter employed in multicast transmission or broadcast transmission by the MBMS or the like is described in DeliverySystemIdentifier of DeliverySystemAttributes.

Further, for example, when a broadcast bearer of the existing television broadcasting network such as the DVB terrestrial network is used, a format identifier (ID_DVB_T in the case of the DVB terrestrial network) of a data structure of a tuning parameter employed in broadcast transmission of the DVB terrestrial network is described.

A data structure (a parameter) corresponding to a delivery form identified by DeliverySystemIdentifier is described in DeliverySystemDescriptor of DeliverySystemAttributes.

[Operation of Content Supply System 50]

Next, an operation of the content supply system 50 will be described.

Figure 12:
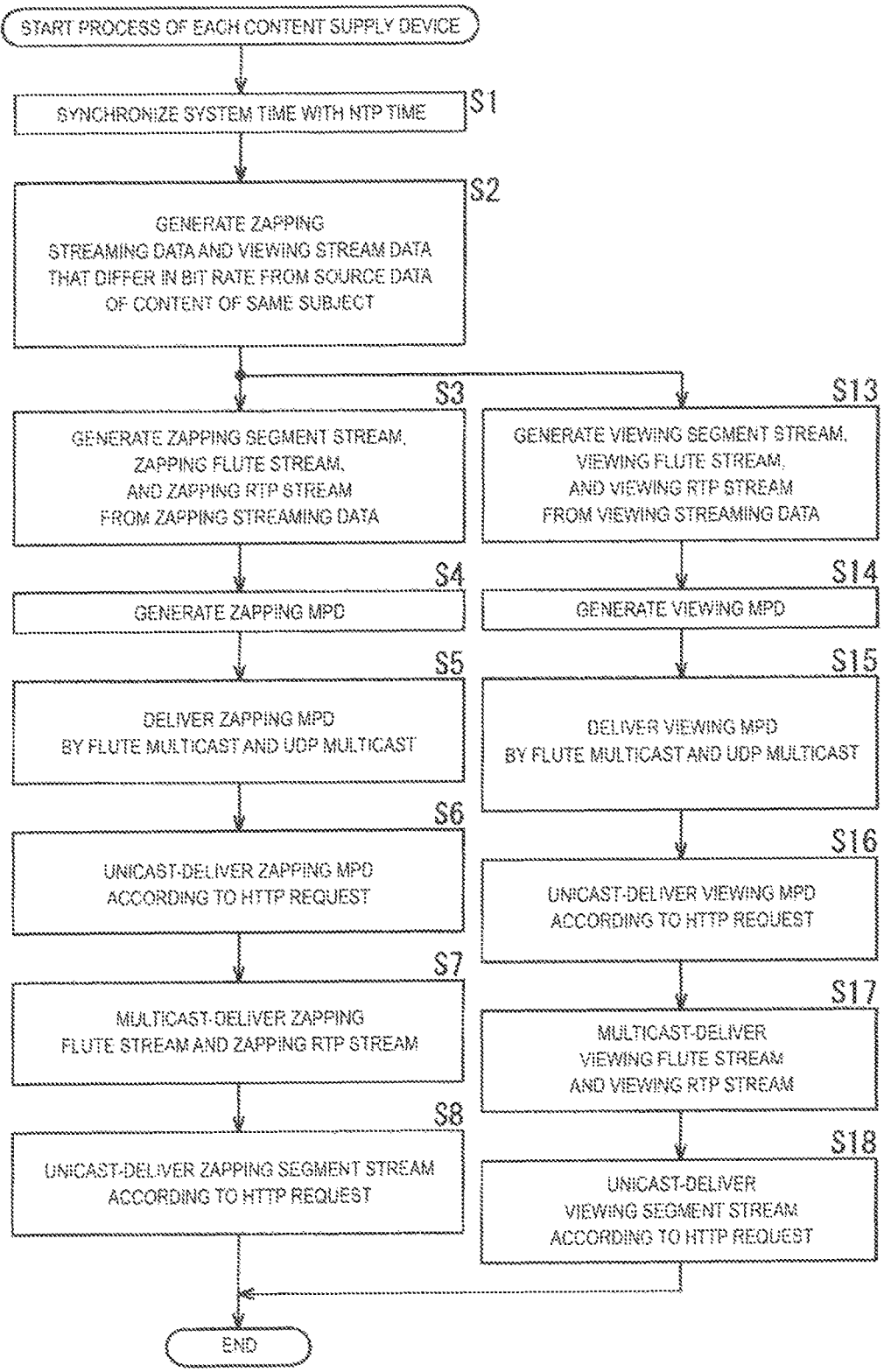
FIG. 12 is a flowchart for describing a process of a consent supply device.

FIG. 12 is a flowchart for describing a process performed by each content supply device 60 in order to deliver content. The following description will proceed with an example of the content supply device 60A that delivers content as the channel A.

In step S1, the content supply device 60A synchronizes its system time with the NTP time axis according to the system time information provided from the NTP server 52. As a result, the zapping segmenter 62 and the like configuring the content supply device 60A operates in synchronization with the NTP time axis.

In step S2, the channel server 61 generates the zapping streaming data and the viewing streaming data that differ in bit rate from source data of content to be delivered as the channel A. The channel server 61 outputs the zapping streaming data to the zapping segmenter 62 end the RTP streamer 66, and outputs the viewing streaming data to the viewing segmenter 64 and the RTP streamer 66.

The process of steps S3 to S8 and the process of steps S13 to S18 are performed in parallel, but for convenience of description, the process of steps S3 to S8 will be first described.

In step S3, the RTP streamer 66 generates the zapping RTP stream by storing the zapping streaming data input from the channel server 61 in the RTP packet, and outputs the zapping RTP stream to the multicast server 69. The RTP streamer 66 notifies the zapping MPD generator 63 of the metadata of the zapping RTP stream.

The zapping segmenter 62 generates the zapping segment stream such as the fragmented MP4 by temporally delimiting the zapping streaming data input from the channel server 61 into periods and further dividing the period into segments, and outputs the zapping segment stream to the FLUTE streamer 67 and the WEB server 68. The zapping segmenter 62 notifies the zapping MPD generator 63 of the metadata of the generated zapping segment stream.

The FLUTE streamer 67 generates the zapping FLUTE stream by storing the zapping segment stream input from the zapping segmenter 62 in the FLUTE packet, and outputs the zapping FLUTE stream to the multicast server 60.

In step S4, the zapping MPD generator 63 generates the zapping MPD necessary when the terminal device 80 receives the zapping segment stream or the zapping RTP stream, and outputs the zapping MPD to the FLUTE streamer 67 and the WEB server 68.

In step S5, the FLUTE streamer 67 outputs the zapping MPD input from the zapping MPD generator 63 to the multicast server 69. The multicast server 69 FLUTE-multicast-delivers and UDP-multicast-delivers the zapping MPD.

In step S6, when there is the request (the HTTP request) from the MPD acquisition portal 70 or the terminal device 80, the WEB server 68 HTTP-unicast-delivers the zapping MPD to the request source in response to the request.

In step S7, the multicast server 69 FLUTE-multicast-delivers the zapping FLUTE stream, and RTP-multicast-delivers the zapping RTP stream.

In step S8, when there is the request (the HTTP request) from the terminal device 80, the WEB server 68 HTTP-unicast-delivers the zapping segment stream to the request source in response to the request.

In parallel to the process of steps S3 to S8, in step S13, the RTP streamer 66 generates the viewing RTP stream by storing the viewing streaming data input from the channel server 61 in the RTP packet, and outputs the viewing RTP stream to the multicast server 69. The RTP streamer 66 notifies the viewing MPD generator 65 of the metadata of the viewing RTP stream.

The viewing segmenter 64 generates the viewing segment stream such as a fragmented MP4 by temporally delimiting the viewing streaming data input from the channel server 61 into periods and further dividing the period info segments, and outputs the viewing segment stream to the FLUTE streamer 67 and the WEB server 68. The viewing segmenter 64 notifies the viewing MPD generator 65 of the metadata of the generated viewing segment stream.

The FLUTE streamer 67 generates the viewing FLUTE stream by storing the viewing segment stream input from the viewing segmenter 64 in the FLUTE packet, and outputs the viewing FLUTE stream to the multicast server 69.

In step S14, the viewing MPD generator 65 generates the viewing MPD necessary when the terminal device 80 receives the viewing segment stream or the viewing RTP stream, and outputs the viewing MPD to the FLUTE streamer 67 and the WEB server 68.

In step S15, the FLUTE streamer 67 outputs the viewing MPD input from the viewing MPD generator 65 to the multicast server 69. The multicast server 69 FLUTE-multicast-delivers and UDP-multicast-delivers the viewing MPD.

In step S16, when there is the request (the HTTP request) from the MPD acquisition portal 70 or the terminal device 80, the WEB server 68 HTTP-unicast-delivers the viewing MPD to the request source in response to the request.

In step S17, the multicast server 69 FLUTE-multicast-delivers the viewing FLUTE stream, and RTP-multicast-delivers the viewing RTP stream.

In step S18, when there is the request (the HTTP request) from the terminal device 80, the WEB server 68 HTTP-unicast-delivers the viewing segment stream to the request source in response to the request. The process performed by each content supply device 60 is thus finished.

Figure 13:
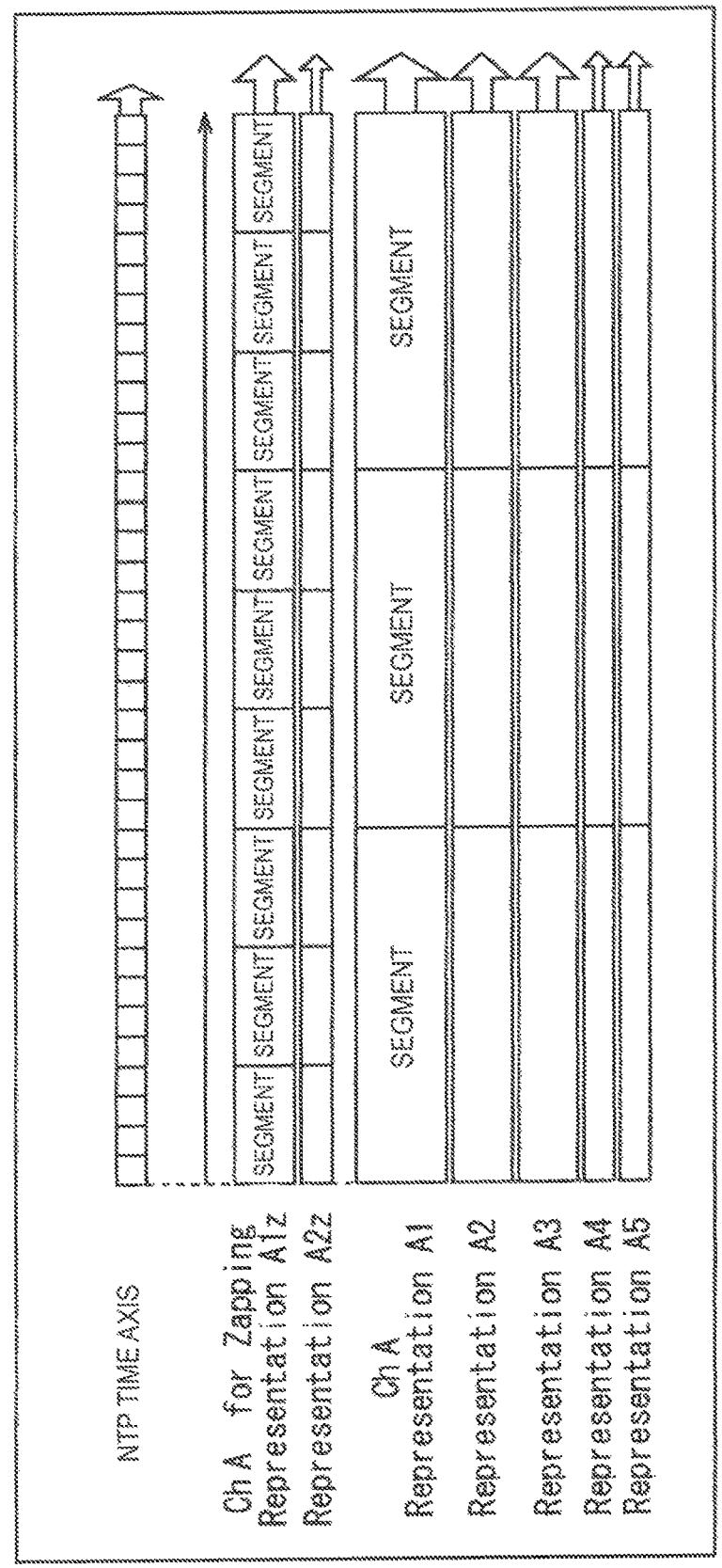
FIG. 13 is a diagram illustrating a difference between a zapping segment length and a viewing segment length.

FIG. 13 illustrates the segment delimiter of the zapping segment stream generated by the process of step S3 of FIG. 12 and the viewing segment stream generated by the process of step S13.

As illustrated in FIG. 13, in the content supply device 60A corresponding to the channel A, one or more (two in FIG. 13) zapping segment streams and two or more (five in FIG. 13) viewing streams are generated, and the segment delimiters thereof are synchronized with the NTP lime axis.

The segment delimiter of the zapping stream matches the segment delimiter (not illustrated) of the zapping stream of another channel belonging to the same group.

Next, a series of processes of the content supply system 50 until the terminal device 80 transitions to a viewing phase through a zapping phase of content will be described with reference to FIGS. 14 and 15 thereafter referred to as a series of processes).

Figure 14:
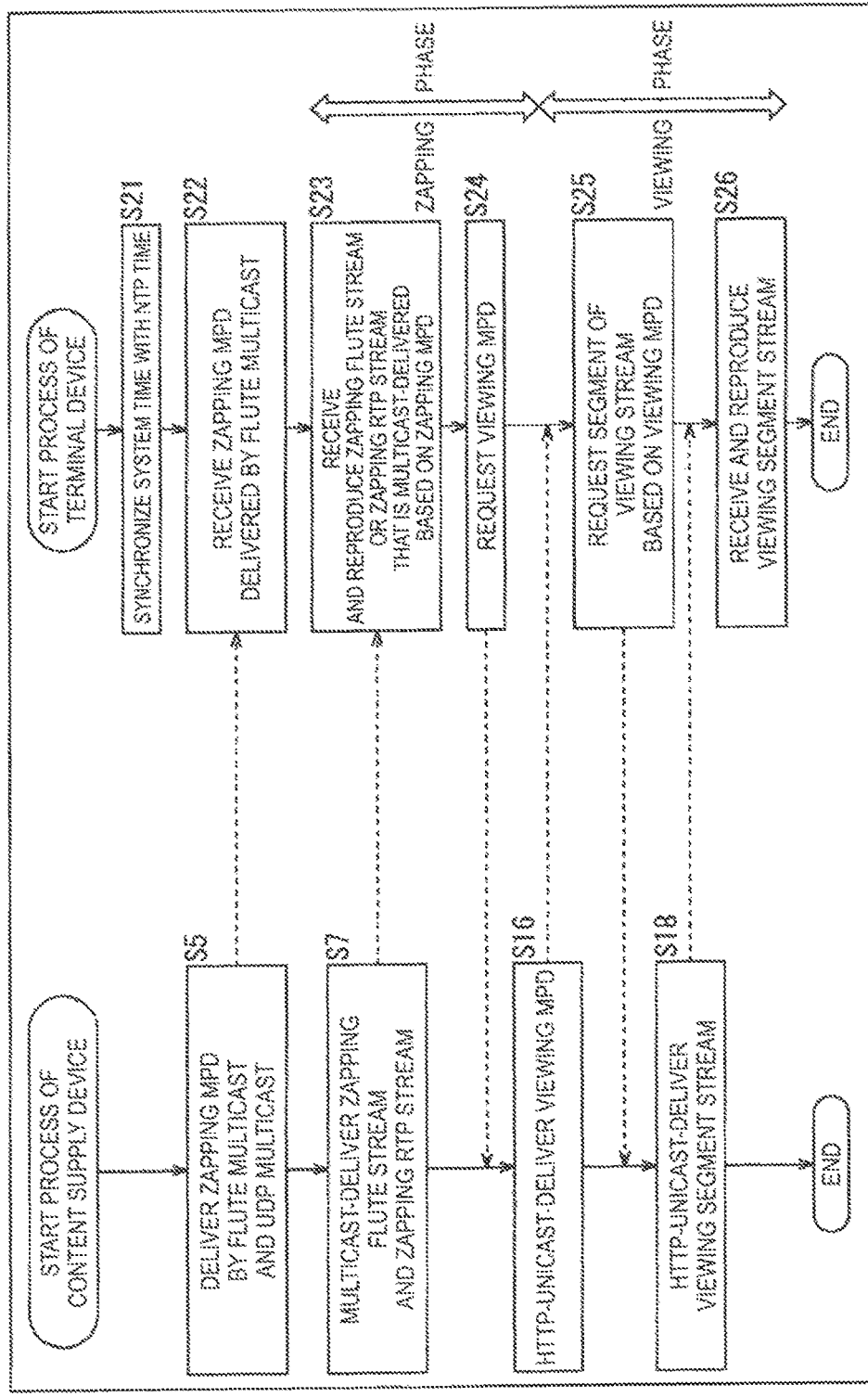
FIG. 14 is a flowchart for describing a series of processes of a content supply system.

FIG. 14 is a flowchart corresponding to a case in which the terminal device 80 can receive the zapping MPD that is multicast-delivered and receive and reproduce the zapping FLUTE stream or the RTP stream that is multicast-delivered. A method of receiving the viewing MPD and the viewing stream is arbitrary, but since the HTTP-unicast-delivered viewing stream commonly has high image quality (a high bit rate), the viewing stream that is HTTP-unicast-delivered is received whenever possible.

In step S21, the terminal device 80 synchronizes its system time with the NTP tune axis according to the system time information provided from the NTP server 52. In step S22, the terminal device 80 receives the zapping MPD that is FLUTE-multicast-delivered as the process of step S5 of FIG. 12. Further, instead of receiving the zapping MPD, a request for the zapping MPD may be transmitted to the MPD acquisition portal 70. The terminal device 80 that has received the zapping MPD enters the zapping phase.

In step S23, the terminal device 80 receives and reproduces the zapping FLUTE stream that is FLUTE-multicast-delivered or the zapping RTP stream that is RTP-multicast-delivered as the process of step S7 of FIG. 12 based on the zapping MPD.

During the zapping phase, the terminal device 80 can perform the rapid zapping between channels belonging to the same group by appropriately repeating the process of step S23.

The terminal device 80 acquires the viewing MPD during the zapping phase. Specifically, in step S24, the terminal device 80 requests the WED server 68 to transmit the viewing MPD, and receives the viewing MPD that is HTTP-unicast-delivered as the process of step S16 of FIG. 12.

The terminal device 80 that has received the viewing MPD can transition from the zapping phase to the viewing phase. In step S25, the terminal device 80 requests the WEB server 68 to transmit the viewing segment stream based on the viewing MPD. In response to the request, the WEB server 68 HTTP-unicast-delivers the requested viewing segment stream as step S18 of FIG. 12, and in step S26, the terminal device 80 receives and reproduces the HTTP-unicast-delivered viewing segment stream.

Thereafter, the terminal device 80 can return from the viewing phase to the zapping phase and then transition to the viewing phase again. The description of the series of processes is now finished. According to the series of process described above, it is possible to rapidly perform zapping between channels belonging to the same group without the occurrence of an extra delay.

Figure 15:
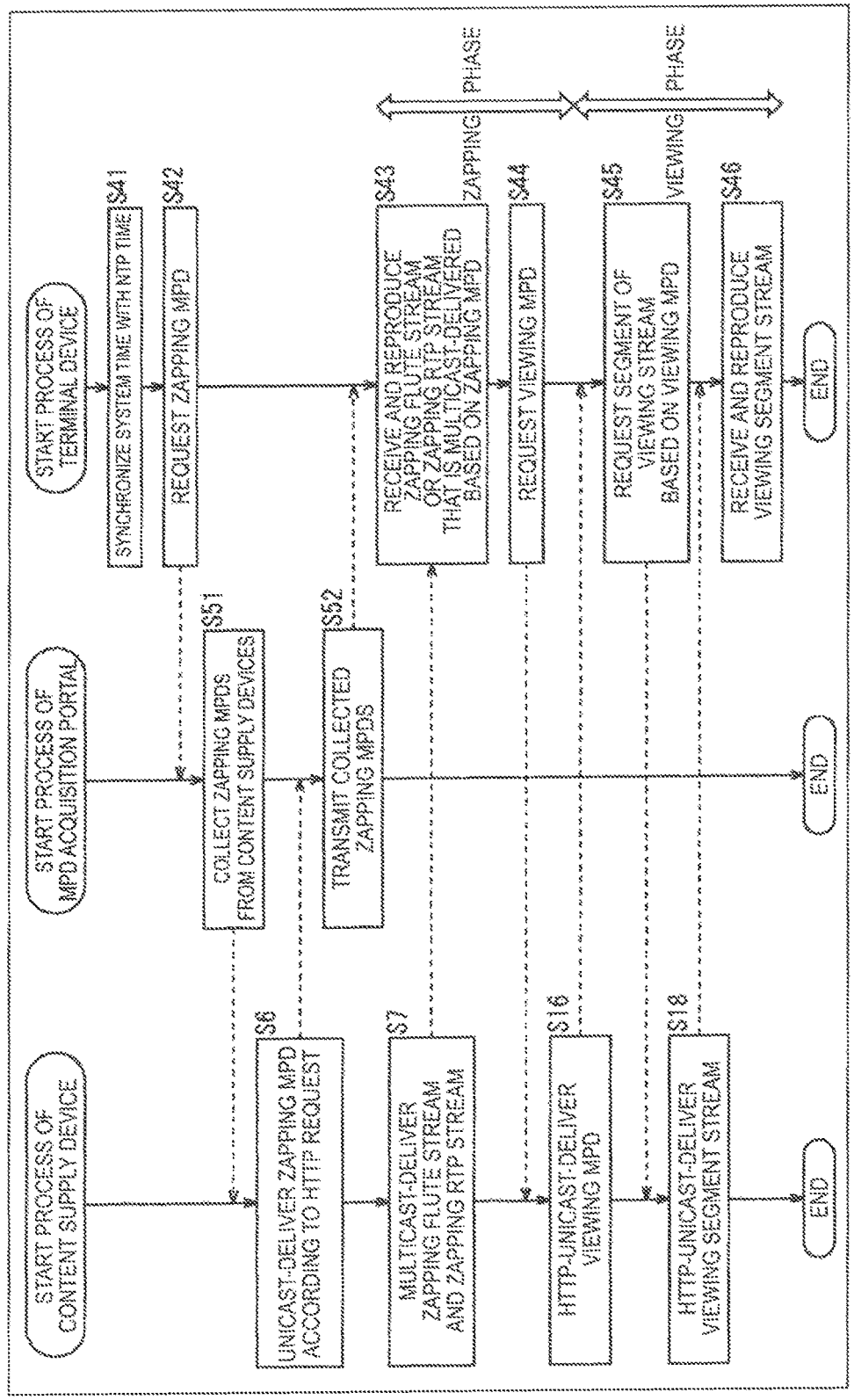
FIG. 15 is a flowchart for describing a series of processes of a content supply system.

Next, FIG. 15 is a flowchart corresponding to a case in which the terminal device 80 can acquire the HTTP-unicast-delivered zapping MPD and receive and reproduce the zapping FLUTE stream or the RTP stream that is multicast-delivered. A method of receiving the viewing MPD and the viewing stream is arbitrary, similarly to the example of FIG. 14, but since the HTTP-unicast-delivered viewing stream commonly has high image quality (a high bit rate), the viewing stream that is HTTP-unicast-delivered is received whenever possible.

In step S41, the terminal device 80 synchronizes its system time with the NTP time axis according to the system time information provided from the NTP server 52. In step S42, the terminal device 80 requests the MPD acquisition portal 70 to transmit the zapping MPD. In response to the request, in step S51, the MPD acquisition portal 70 is connected to the WEB server 68 of each content supply device 60, and requests the WEB server 68 of each content supply device 60 to transmit the zapping MPD (the MPD in which the MPD/@NTPSynchronized attribute is true, and the MPD/@SegmentAlignedGroupID attribute is the same group identifier). In response to the request, the WEB server 68 HTTP-unicast-delivers the zapping MPD to the MPD acquisition portal 70 as the process of step S6 of FIG. 12.

In step S52, the MPD acquisition portal 70 collects the HTTP-unicast-delivered zapping MPD, and transmits the collected zapping MPD to the terminal device 80 of the request source. The MPD acquisition portal 70 may collect the UDP-multicast-delivered zapping MPD. Further, the terminal device 80 may collect the zapping MPD from the WEB server 68 of each content supply device 60 directly without using the MPD acquisition portal 70. The terminal device 80 that has received the zapping MPD enters the zapping phase.

In step S43, the terminal device 80 receives and reproduces the zapping FLUTE stream that is FLUTE-multicast-delivered or the zapping RTP stream that is RTP-multicast-delivered as the process of step S7 of FIG. 12 based on the zapping MPD.

During the zapping phase, the terminal device 80 can perform the rapid zapping between channels belonging to the same group by appropriately repeating the process of step S43.

The terminal device 80 acquires the viewing MPD during the zapping phase. Specifically, in step S44, the terminal device 80 requests the WEB server 68 to transmit the viewing MPD, and receives the viewing MPD that is HTTP-unicast-delivered as the process of step S16 of FIG. 12 in response to the request.

The terminal device 80 that has received the viewing MPD can transition from the zapping phase to the viewing phase. In step S45, the terminal device 80 requests the WEB server 68 to transmit the viewing segment stream based on the viewing MPD. In response to the request the WEB server 68 HTTP-unicast-delivers the requested viewing segment stream as step S18 of FIG. 12, and in step S46, the terminal device 80 receives and reproduces the HTTP-unicast-delivered viewing segment stream.

Thereafter, the terminal device 80 can return from the viewing phase to the zapping phase and then transition to the viewing phase again. The description of the series of processes is now finished. According to a series of process described above, it is possible to rapidly perform zapping between channels belonging to the same group without the occurrence of an extra delay.

Figure 16:
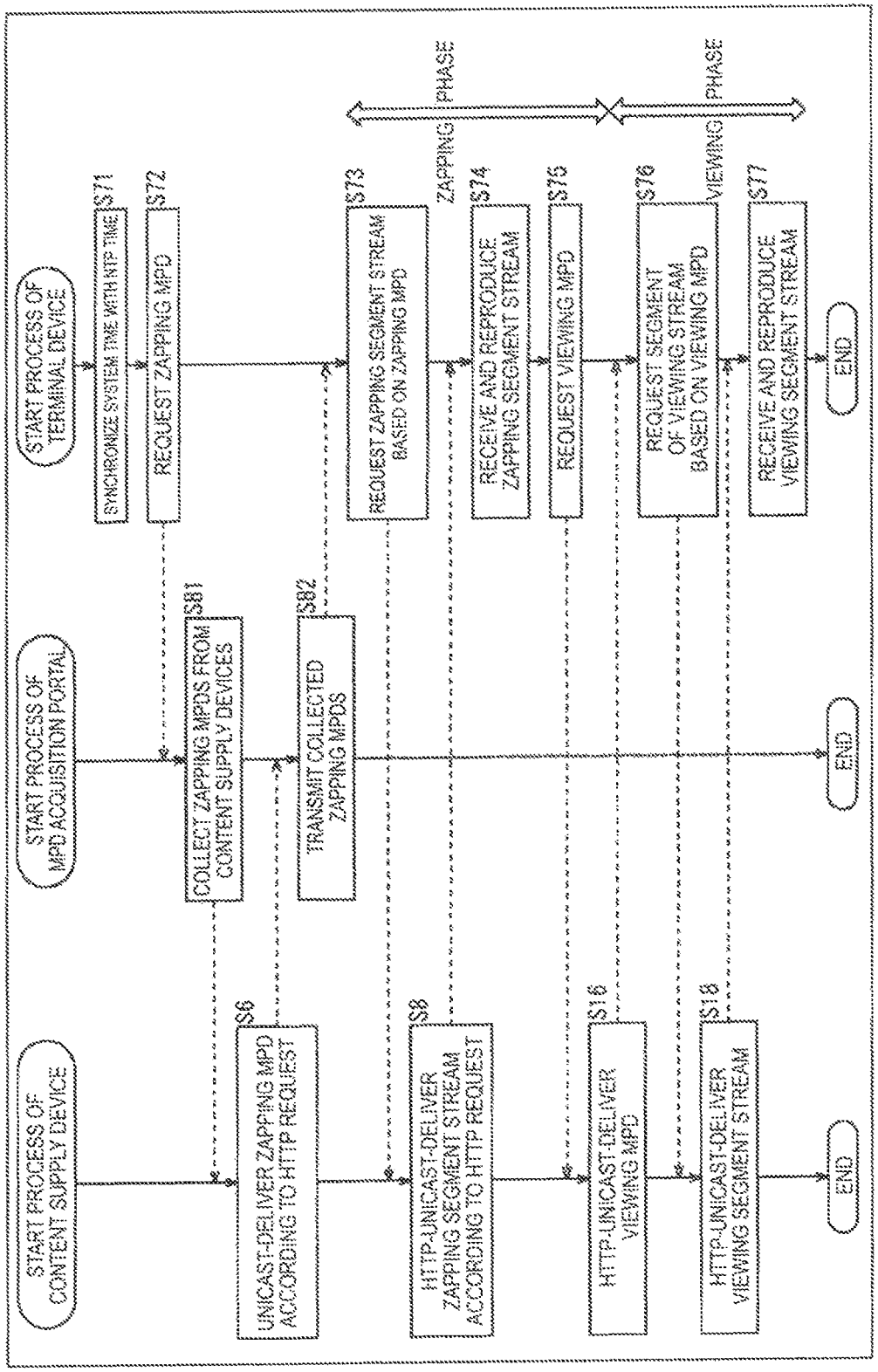
FIG. 16 is a flowchart for describing a series of processes of a content supply system.

Next, FIG. 16 is a flowchart corresponding to a case in which the terminal device 80 can acquire the HTTP-unicast-delivered zapping MPD and receive and reproduce the HTTP-unicast-delivered zapping segment stream rather than the zapping FLUTE stream or the RTP stream that is multicast-delivered. A method of receiving the viewing MPD and the viewing stream is arbitrary, similarly to the example of FIG. 14, but since the HTTP-unicast-delivered viewing stream commonly has high image quality (a high bit rate), the viewing stream that is HTTP-unicast-delivered is received whenever possible.

In step S71, the terminal device 80 synchronizes its system time with the NTP time axis according to the system time information provided from the NTP server 52. In step S72, the terminal device 80 requests the MPD acquisition portal 70 to transmit the zapping MPD. In response to the request in step S81, the MPD acquisition portal 70 is connected to the WEB server 68 of each content supply device 60, and requests the WEB server 68 of each content supply device 60 to transmit the zapping MPD. In response to the request, the WEB server 68 HTTP-unicast-delivers the zapping MPD in the MPD acquisition portal 70 as the process of step S6 of FIG. 12.

In step S82, the MPD acquisition portal 70 collects the HTTP-unicast-delivered zapping MPD, and transmits the collected zapping MPD to the terminal device 80 of the request source. The MPD acquisition portal 70 may collect the UDP-multicast-delivered zapping MPD. Further, the terminal device 80 may collect the zapping MPD from the WEB server 68 of each content supply device 60 directly without using the MPD acquisition portal 70. The terminal device 80 that has received the zapping MPD enters the zapping phase.

In step S73, the terminal device 80 requests the WEB server 68 to transmit the zapping segment stream based on the zapping MPD. In response to the request, the WEB server 68 HTTP-unicast-delivers the zapping segment stream to the terminal device 80 as the process of step S8 of FIG. 12.

In step S74, the terminal device 80 receives and reproduces the HTTP-unicast-delivered zapping segment stream.

During the zapping phase, the terminal device 80 can perform the rapid zapping between channels belonging to the same group by appropriately repeating the process of steps S73 and S74.

The terminal device 80 acquires the viewing MPD during the zapping phase. Specifically, in step S75, the terminal device 80 requests the WEB server 68 to transmit the viewing MPD, and receives the viewing MPD that is HTTP-unicast-delivered as the process of step S16 of FIG. 12 in response to the request.

The terminal device 80 that has received the viewing MPD can transition from the zapping phase to the viewing phase. In step S76, the terminal device 80 requests the WEB server 68 to transmit the viewing segment stream based on the viewing MPD. In response to the request, the WEB server 68 HTTP-unicast-delivers the requested viewing segment stream as step S18 of FIG. 12, and in step S77, the terminal device 80 receives and reproduces the HTTP-unicast-delivered viewing segment stream.

Thereafter, the terminal device 80 can return from the viewing phase to the zapping phase and then transition to the viewing phase again. The description of the series of processes is now finished. According to the series of processes described above, it is possible to rapidly perform zapping between channels belonging to the same group without the occurrence of an extra delay.

In the above description, switching between channels in DASH is performed in units of segments, but switching between channels may be performed in units of sub segments obtained by subdividing the segments. In this case, preferably, an MPD/@SubSegmentDuration attribute storing a value indicating a sub segment length is mandatorily described in the zapping MPD and the viewing MPD, and "segment" in the above description is replaced with "sub segment."

By the way, each of the content supply device 60 and the terminal device 80 that execute a series of processes described above can be configured with hardware or can be implemented by executing software through a computer. Examples of the computer include a computer embedded in dedicated hardware and a general purpose personal computer capable of installing various kinds of programs and executing various kinds of functions.

FIG. 17 is a block diagram illustrating an exemplary hardware configuration of the computer.

In a computer 100, a central processing unit (CPU) 101, a read only memory (ROM) 102, and a random access memory (RAM) 103 are connected with one another via a bus 104.

An input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface. The drive 110 drives a removable medium 111 such as a magnetic disk, an optical disk, a magneto-optical disk, or a semiconductor memory.

In the computer 100 having the above-described configuration, for example, a series of processes described above are performed by loading a program stored in the storage unit 108 onto the RAM 103 through the input output interface 105 and the bus 104 and executing the loaded program through the CPU 101.

For example, the program executed by the computer 100 (the CPU 101) may be recorded in the removable medium 111 serving as a package medium or the like and provided. The program may be provided via a wired or wireless transmission medium such as a local area network, the Internet, or digital satellite broadcasting.

In the computer 100, the removable medium 111 may be mounted on the drive 110, and the program may be installed in the storage unit 108 through the input/output interface 105. The program may be received by the communication unit 109 via a wired or wireless transmission medium and installed in the storage unit 108. Moreover, the program may be installed in the ROM 102 or the storage unit 108 in advance.

Further, the program executed by the computer 100 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)

A content supply device that supplies a plurality of pieces of streaming data that include content of a same subject and differ in attribute through a same channel, according to an adaptive streaming technique, the content supply device including:

a zapping segment stream generating unit configured to generate a zapping segment stream by delimiting zapping streaming data among the plurality of pieces of streaming data into minimum units when reception of the streaming data is switched, according to a common timing with another channel;

a unicast delivery unit configured to unicast-deliver the zapping segment stream;

a multicast delivery unit configured to multicast-deliver the zapping segment stream; and a metafile generating unit configured to generate a metafile for a reception side to receive the zapping segment stream that is unicast-delivered and multicast-delivered.

(2)

The content supply device according to (1), wherein the zapping segment stream generating unit generates the zapping segment stream by delimiting the zapping streaming data into the minimum units, according to a common timing with the other channel belonging to a same group.

(3)

The content supply device according to (1) or (2), wherein the unicast delivery unit HTTP-unicast-delivers the zapping segment stream, and wherein the multicast delivery unit FLUTE-multicast-delivers a zapping FLUTE stream based on the zapping segment stream.

(4)

The content supply device according to any of (1) to (3), further including:

an RTP stream generating unit configured to generate a zapping RTP stream based on the zapping streaming data among the plurality of pieces of streaming data, wherein the metafile generating unit generates a metafile for the reception side to receive the zapping segment stream that is HTTP-unicast-delivered, the zapping FLUTE stream that is FLUTE-multicast-delivered, and the zapping RTP stream that is RTP-multicast-delivered, and wherein the multicast delivery unit also RTP-multicast-delivers the zapping RTP stream.

(5)

The content supply device according to any of (1) to (4), wherein the zapping segment stream generating unit generates the zapping segment stream by aligning heads of the minimum units with the other channel belonging to the same group in synchronization with an NTP time axis and delimiting the zapping streaming data into the minimum units using a common duration with the other channel belonging to the same group.

(6)

The content supply device according to any of (1) to (5), wherein the zapping segment stream generating unit generates the zapping segment stream by delimiting the zapping streaming data into the minimum units using a duration shorter than the minimum unit of viewing streaming data.

(7)

The content supply device according to any of (1) to (6), wherein the metafile generating unit generates an extended MPD as the metafile.

(8)

The content supply device according in any of (1) to (7), further including;

a collecting unit configured to collect the metadata and supply the metadata to the reception side.

(9)

The content supply device according to (8), wherein the metafile generating unit generates the MPD in which an MPD/@NTPSynchronized attribute and an MPD/SegmentAlignedGroupID attribute are introduced, as the metafile, and wherein the collecting unit collects the metadata for the zapping based on the MPD/@NTPSynchronized attribute and the MPD/SegmentAlignedGroupID attribute.

(10)

The content supply device according in (8), wherein the metafile generating unit generates the MPD in which an MPD/@forZapping attribute is introduced, as the metafile, and wherein the collecting unit collects the metadata for the zapping based on the MPD/@forZapping attribute.

(11)

The content supply device according to (8), wherein the metafile generating unit describes at least one of a duration and a maximum duration of the minimum unit of the streaming data in the metadata, as the metafile, and wherein the collecting unit collects the metadata for the zapping based on the at least one of the duration and the maximum duration of the minimum unit of the streaming data.

REFERENCE SIGNS LIST 50 content supply system
51 network
52 NTP server
60 content supply device
61 channel server
62 zapping segmenter
63 zapping MPD generator
64 viewing segmenter
65 viewing MPD generator
66 RTP streamer
67 FLUTE streamer
68 WEB server
69 multicast server
70 MPD acquisition portal
80 terminal device
100 computer
101 CPU

The invention claimed is:

1. A content supply device that supplies a plurality of pieces of streaming data that include content of a same subject and differ in attribute through a same channel, according to an adaptive streaming technique, the content supply device comprising:

circuitry configured to generate a zapping metafile corresponding to a zapping segment stream including streaming data temporally divided into second durations shorter than first durations into which the streaming data is divided in a viewing segment stream, the zapping metafile including metadata describing the second durations;

in response to generating the zapping metafile corresponding to the zapping segment stream, generate a viewing metafile different from the zapping metafile, the viewing metafile corresponding to the viewing segment stream and describing the first durations;

transmit the zapping metafile to a receiving device;

transmit the zapping segment stream to the receiving device; and after transmitting the zapping metafile and beginning to transmit the zapping segment stream, transmit the viewing metafile different from the zapping metafile and begin to transmit the viewing segment stream to the receiving device.

2. The content supply device according to claim 1, wherein the circuitry is configured to generate the zapping segment stream by dividing the streaming data into the second durations matching durations of a zapping segment stream of another channel belonging to a same group and encoding the streaming data.

3. The content supply device according to claim 2, wherein the circuitry HTTP-unicast-delivers the zapping segment stream, and wherein the circuitry FLUTE-multicast-delivers a zapping FLUTE stream based on the zapping segment stream.

4. The content supply device according to claim 3, wherein the circuitry is further configured to generate a zapping RTP stream based on the streaming data,
   wherein the circuitry generates a metafile for the receiving device to receive the zapping segment stream that is HTTP-unicast-delivered, the zapping FLUTE stream that is FLUTE-multicast-delivered, and the zapping RTP stream that is RTP-multicast-delivered, and
   wherein the circuitry RTP-multicast-delivers the zapping RTP stream.

5. The content supply device according to claim 2,
   wherein the circuitry generates an extended MPD as the zapping metafile.

6. The content supply device according to claim 2, wherein the circuitry is further configured to collect the metadata for generating the zapping metafile.

7. The content supply device according to claim 6, wherein the circuitry collects the metadata for generating the zapping metafile based on the second duration into which the streaming data is temporally divided, the second duration being described in the zapping metafile.

8. The content supply device according to claim 6, wherein the circuitry includes in the zapping metafile attribute information indicating that the zapping segment stream is for zapping, and
   wherein the circuitry collects the metadata for the zapping metafile based on the attribute information that is included in the zapping metafile and indicates that the zapping segment stream is for zapping.

9. The content supply device according to claim 6,
   wherein the circuitry includes in the zapping metafile attribute information indicating a group to which the channel belongs, and
   wherein the circuitry collects the metadata for the zapping metafile based on the attribute information that is included in the zapping metafile and indicates the group to which the channel belongs.

10. A content supply method of a content supply device that supplies a plurality of pieces of streaming data that include content of a same subject and differ in attribute through a same channel, according to an adaptive streaming technique, the content supply method comprising:
   generating a zapping metafile corresponding to a zapping segment stream including streaming data temporally divided into second durations shorter than first durations into which the streaming data is divided in a viewing segment stream, the zapping metafile including metadata describing the second durations;
   in response to generating the zapping metafile corresponding to the zapping segment stream, generating a viewing metafile different from the zapping metafile, the viewing metafile corresponding to the viewing segment stream and describing the first durations;
   transmitting the zapping metafile to a receiving device;
   transmitting, by the content supply device, the zapping segment stream to the receiving device; and
   after transmitting the zapping metafile and beginning to transmit the zapping segment stream, transmitting the viewing metafile different from the zapping metafile and beginning to transmit the viewing segment stream to the receiving device.

11. A non-transitory computer-readable storage medium storing computer-readable instructions thereon, which, when executed by a computer that supplies a plurality of pieces of streaming data that include content of a same subject and differ in attribute through a same channel, according to an adaptive streaming technique, cause the computer to perform a method comprising:
   generating a zapping metafile corresponding to a zapping segment stream including streaming data temporally divided into second durations shorter than first durations into which the streaming data is divided in a viewing segment stream, the zapping metafile including metadata describing the second durations;
   in response to generating the zapping metafile corresponding to the zapping segment stream, generating a viewing metafile different from the zapping metafile, the viewing metafile corresponding to the viewing segment stream and describing the first durations;
   transmitting the zapping metafile to a receiving device;
   transmitting the zapping segment stream to the receiving device; and
   after transmitting the zapping metafile and beginning to transmit the zapping segment stream, transmitting the viewing metafile different from the zapping metafile and beginning to transmit the viewing segment stream to the receiving device.

12. A receiving device comprising:
circuitry configured to
   acquire a zapping metafile corresponding to a zapping segment stream including streaming data temporally divided into second durations shorter than first durations into which the streaming data is divided in a viewing segment stream, the zapping metafile including metadata describing the second durations,
   perform reception of the zapping segment stream, based on the acquired zapping metafile,
   in response to acquiring the zapping metafile and beginning to perform reception of the zapping segment stream, receive the viewing segment stream and a viewing metafile different from the zapping metafile, the viewing metafile corresponding to the viewing segment stream and describing the first durations, and
   switch from reception of the zapping segment stream to reception of the viewing segment stream.

13. A content supply system comprising:
a content supply device configured to supply a plurality of pieces of streaming data that include content of a same subject and differ in attribute through a same channel, according to an adaptive streaming technique; and
a receiving device configured to receive the streaming data,
wherein the content supply device includes
   circuitry configured to
      generate a zapping metafile corresponding to a zapping segment stream including streaming data temporally divided into second durations shorter than first durations into which the streaming data is divided in a viewing segment stream, the zapping metafile including metadata describing the second durations;
      in response to generating the zapping metafile corresponding to the zapping segment stream, generate a viewing metafile different from the zapping metafile, the viewing metafile corresponding to the viewing segment stream and describing the first durations;
      transmit the zapping metafile to a receiving device;
      transmit the zapping segment stream to the receiving device; and
      after transmitting the zapping metafile and beginning to transmit the zapping segment stream, transmit the viewing metafile different from the zapping metafile and begin to transmit the viewing segment stream to the receiving device, and wherein the receiving device includes circuitry configured to acquire the zapping metafile, perform reception of the zapping segment stream, based on the acquired zapping metafile, receive the viewing metafile different from the zapping metafile and the viewing segment stream, and switch from reception of the zapping segment stream to reception of the viewing segment stream.

14. The receiving device according to claim 12, wherein the zapping segment stream is comprised of the streaming data divided into the second durations matching durations of a zapping segment stream of another channel belonging to a same group, the divided streaming data being encoded.

15. The receiving device according to claim 14, wherein the zapping segment stream is HTTP-unicast-delivered to the receiving device, and wherein a zapping FLUTE stream based on the zapping segment stream is FLUTE-multicast-delivered to the receiving device.

16. The receiving device according to claim 15, wherein the receiving device receives the zapping segment stream that is HTTP-unicast-delivered, the zapping FLUTE stream that is FLUTE-multicast-delivered, and a zapping RTP stream that is RTP-multicast-delivered and generated based on the streaming data.

17. The receiving device according to claim 14, wherein the zapping metafile is generated as an extended MPD.

18. The receiving device according to claim 14, wherein the zapping metafile is generated using collected metadata.

* * * * *